United States Patent [19]

Hongo

[11] Patent Number: 5,588,124
[45] Date of Patent: Dec. 24, 1996

[54] MICROCOMPUTER

[75] Inventor: Katsunobu Hongo, Itami, Japan

[73] Assignee: Mitsubishi Denki Kabushiki Kaisha, Tokyo, Japan

[21] Appl. No.: 351,000

[22] Filed: Nov. 29, 1994

[30] Foreign Application Priority Data

Nov. 29, 1993 [JP] Japan .................... 5-298087

[51] Int. Cl.⁶ .................................... G06F 13/00
[52] U.S. Cl. ............................ 395/287; 395/307
[58] Field of Search .................. 395/307, 308, 395/309, 306, 550, 800, 287

[56] References Cited

U.S. PATENT DOCUMENTS

| | | | |
|---|---|---|---|
| 4,860,198 | 8/1989 | Takenaka | 395/307 |
| 5,045,998 | 9/1991 | Begun et al. | 395/307 |
| 5,255,374 | 10/1993 | Aldereguia | 395/307 X |
| 5,276,818 | 1/1994 | Okazawa et al. | 395/294 |
| 5,347,643 | 9/1994 | Kondo et al. | 395/421.01 |
| 5,388,227 | 2/1995 | McFarland | 395/307 |
| 5,440,749 | 8/1995 | Moore et al. | 395/800 |
| 5,450,552 | 9/1995 | Michino | 395/281 |

*Primary Examiner*—Glenn A. Auve
*Attorney, Agent, or Firm*—Lowe, Price, LeBlanc & Becker

[57] ABSTRACT

A microcomputer comprises control signal generation means for generating a control signal to be supplied to an external circuit having different bus cycles and outputting a plurality of control signals. Since there is no need to delay the operation speed of an external circuit which operates fast in compliance with an external circuit which operates slowly, it is possible to improve the overall operation speed.

16 Claims, 20 Drawing Sheets

FIG. 16

| WIDTH OF EXTERNAL BUS | OUTPUT SIGNAL OF OUTPUT TERMINAL 86 | OUTPUT SIGNAL OF OUTPUT TERMINAL 87 |
|---|---|---|
| 8-BIT | #WR | #SWR |
| 16-BIT | #LWR (ACCESS EVEN ADDRESS) | #HWR (ACCESS ODD ADDRESS) |

MICROCOMPUTER

BACKGROUND OF THE INVENTION

1. Field of the Invention

The present invention relates to a microcomputer. More particularly, the present invention relates to a microcomputer to be connected with external circuits including memories via an external bus.

2. Description of Related Art

In general, in a microcomputer which can be connected with external circuits such as a memory (ROM, RAM, and so on), a gate array and an exclusive use IC via an external bus, and outputs an address/data signal and control signals such as a read/write signal to the external circuits and receives the address/data signal from the external circuits, due to a constraint in the number of terminals of the microcomputer, an address signal and a data signal are assigned to the same terminal and inputted or outputted at this terminal in a time division manner (i.e., multiplex bus method). Hence, the address/data signal outputted from the microcomputer must be separated into an address signal and a data signal outside the microcomputer. To this end, an address latch enable signal which stays at "H" level during outputting of the address signal is supplied from the micro computer to an address latch circuit. The address latch circuit latches the address signal so that the address/data signal is separated into the address signal and the data signal.

In some exclusive use ICs used for a specified purpose which is externally attached by a user as an external circuit, to reduce the number of the terminals of the exclusive use IC, separation into the address signal and the data signal is performed within the exclusive use IC. In this case, the exclusive use IC includes an address latch circuit, and a multiplex bus for the address/data signal and a control signal bus for an address latch enable signal are connected to the address latch circuit. The address signal is latched by the address latch circuit so that the address/data signal is separated into the address signal and the data signal.

FIG. 1 is a block diagram showing a conventional microcomputer connected with external circuits with the multiplex bus method as above. The microcomputer is indicated at the numerical reference 1. The microcomputer 1 comprises a CPU 2 which receives a clock signal generated by a clock signal generating circuit 71, decodes a predetermined program and controls a peripheral device in accordance with the content of the program. The microcomputer 1 is also provided with a peripheral circuit 3 which includes circuits such as an internal memory (ROM, RAM, and so on), a timer and an A-D conversion circuit. A bus interface circuit 4 which connects an internal bus and an external bus is also disposed in the microcomputer 1. Among the CPU 2, the peripheral circuit 3 and the bus interface circuit 4, the data signal is transferred through an internal data bus 5, the address signal is transferred through an internal address bus 6, and a control signal is transferred through an internal control signal bus 7.

A ROM 15, a RAM 16 and an exclusive use IC 17 which includes an address latch circuit 18 is disposed outside of the microcomputer 1. The address/data signal outputted from the bus interface circuit 4 is supplied to an address latch circuit 13 through an external address/data bus 11 so that an address signal (A) alone is provided to the ROM 15 and the RAM 16 through the external address bus 14. The address/data signal is supplied directly to the exclusive use IC 17. In FIG. 1, the symbol AIC indicates the address signal which is separated by the address latch circuit 18.

The control signal includes an address latch enable signal ALE for controlling a timing of latching the address signal in the address latch circuit 13, a write signal #WR for controlling a timing of writing data and a read signal #RD for controlling a timing of reading data. '#' included in numerals indicate signals means that the signal is active when the signal's level is "L". The control signal is supplied to the bus interface circuit 4 through the internal control signal bus 7, further to the ROM 15, the RAM 16 and the exclusive use IC 17 through an external control signal bus 12.

FIG. 2 is a circuit diagram showing the essential part of the bus interface circuit shown in FIG. 1, and particularly, showing a portion related to outputting of the control signals. The bus interface circuit 4 includes output buffers 20, 21 and 22 and output terminals 23, 24 and 25 which are respectively connected to the output buffers 20, 21 and 22. An internal address latch enable signal ALEint, an internal read signal #RDint and an internal write signal #WRint are supplied to the bus interface circuit 4 through the internal control signal bus 7, and are outputted to external control signal bus 12 from the output terminals 23 24 and 25 through the output buffers 20, 21 and 22, respectively, as the address latch enable signal ALE, the read signal #RD and the write signal #WR.

The ROM 15 and the RAM 16 each include an address terminal and a data terminal. The address signal A separated by the address latch circuit 13 in response to the address latch enable signal ALE is supplied to each address terminal through the external address bus 14. In response to the read signal #RD or the write signal #WR, the data signal is transferred between the external address/data bus 11 and the data terminals. On the other hand, since the exclusive use IC 17 includes the address latch circuit 18, the address/data signal and the address latch enable signal ALE are supplied directly to the exclusive use IC 17 (the address latch circuit 18).

FIG. 3 is a timing chart showing signals of the external bus of FIG. 1. In FIG. 3, the symbol ø indicates a clock signal. The address/data signal is a signal in which address signals A0, A1, A2 . . . and data signals D0, D1, . . . alternately appear. The address latch enable signal ALE rises to "H" level when the address/data signal switches to the address signal. After a certain period of time from the rise of the address latch enable signal ALE, the read signal #RD or the write signal #WR which is in a low active state falls. This period of time is determined depending on an element such as a memory.

In the address latch circuit 13, the address/data signal supplied to an input terminal of the address latch circuit 13 during the "H" level period of the address latch enable signal ALE is supplied, as it is, to an output terminal of the address latch circuit, 13. During the "L" level period of the address latch enable signal ALE, the address latch circuit 13 holds its former state (i.e., the address latch circuit 13 is a D latch. ). Hence, the address signal A changes to the next address upon a rise of the address latch enable signal ALE.

On the other hand, the address latch circuit 18 of the exclusive use IC 17 latches the address/data signal which is supplied to its input terminal during the "H" level period of the address latch enable signal ALE. The address latch circuit 18 outputs its state upon a fall of the address/data signal to "L" level (i.e, the address latch circuit 18 is a D flip-flop.). Hence, the address signal AIC changes to the next address upon a fall of the address latch enable signal ALE.

Thus, determining an address fast and hence being desirable for high-speed memory access, a D latch is used as an address latch for a memory in many cases. Strongly resistant against a noise introduced through an external address/data bus and an address latch enable signal line from outside, a D flip-flop is used as an address latch for an exclusive use IC in many cases. This forces to use two different types of address latches together on the same bus, which in turn causes the address determining times to be different from each other in some cases.

Since circuits such as the ROM 15, the RAM 16 and the exclusive use IC 17 require a certain period of time for an internally provided address decode circuit to operate, it demands a longer time than a prescribed time period from determination of the address signals A and AIC which are to be decoded until the read signal #RD or the write signal #WR changes to "L" level. In FIG. 3, the symbol t(ALE-WR)H expresses a time period from a rise of the address latch enable signal ALE to a fall of the write signal #WR. The symbol t(ALE-WR)L expresses a time period from a fall of the address latch enable signal ALE to a fall of the write signal #WR. The former, which can be long correspondingly to the "H" level period of the address latch enable signal ALE, causes no particular problem. However, the latter which is basically or originally short, needs consideration when the frequency level of the clock signal is to be increased aiming at high-speed operations. In the case as above, in particular, where address latches having different structures are used together, it is not allowed to increase the clock frequency level since this t(ALE-WR)L period must last at least for a certain period of time. For this reason, it is impossible to increase the speed of the operations of the system as a whole. Although the timing of a fall of the write signal #WR can be delayed to deal with this, such contradicts the flexibility of the microcomputer. This is because a timing is determined with a major attention directed to the exclusive use IC although the exclusive use IC is connected only to a special purpose circuit and demands a different time from that of a RAM which is to be always connected. In addition, in this case, the frequency level of the clock signal must be lowered in order to permit the "L" level of the write signal #WR (or the read signal #RD) to appear for a certain time period. This directly contradicts high-speed operations attained by activating the address signal during the "H" level of the address latch enable signal ALE. Hence, this method has only a very limited success.

SUMMARY OF THE INVENTION

The present invention has been developed to solve such problems. A main object of the present invention is to offer a microcomputer which comprises means for outputting a control signal which controls external circuits which have different bus timings so that the flexibility of the microcomputer as a microcomputer will not be deteriorated even when these external circuits which have different bus timings are connected to the same bus and so that even when a clock frequency is increased to shorten a bus cycle time, the system as a whole will operate at a high speed without any adverse influence from the external circuit which has a slower bus timing.

A microcomputer according to the present invention comprises a means for generating a first control signal which is on a first level when an external circuit is to be accessed, and is on a second level in the other period and a control signal generating circuit for generating a second control signal which changes from said second level to said first level at different timing from the timing of said first control signal. Thus, it is possible to provide different control signals to the respective external circuits. Hence, even where each external circuit decodes the address signals at different speeds, the operation speed of the system as a whole can be improved not at the expense of high access speeds of the external circuit or without decreasing the clock Frequency.

For example, when the bus access cycle of a first external circuit which receives said first control signal is shorter than the bus access cycle of a second external circuit, which receives said second control signal the microcomputer can be constructed so that the second control signal remains active during the bus access cycle of the first external circuit. This makes it possible to access said second external circuit having a longer bus access cycle while accessing said first external circuit which has a shorter bus access cycle, which in turn prevents malfunction and an increase in the consumption power due to a reduced control signal supplying time.

Further, the first control signal may be activated only when the address signal is an address signal which is assigned to the first external circuit. This prevents an increase in the consumption power due to an unnecessary change in the signal.

The above and further objects and features of the invention will more fully be apparent from the following detailed description with accompanying drawings.

BRIEF DESCRIPTION OF THE DRAWINGS

FIG. 16 is an explanatory diagram showing signals which are outputted from output terminals of FIGS. 14 and 15 when the external bus is an 8-bit bus and a 16-bit bus, respectively;

DESCRIPTION OF THE PREFERRED EMBODIMENTS

In the following, the present invention will be described with reference to the drawings showing preferred embodiments of the invention.

First Embodiment

Figure 4:
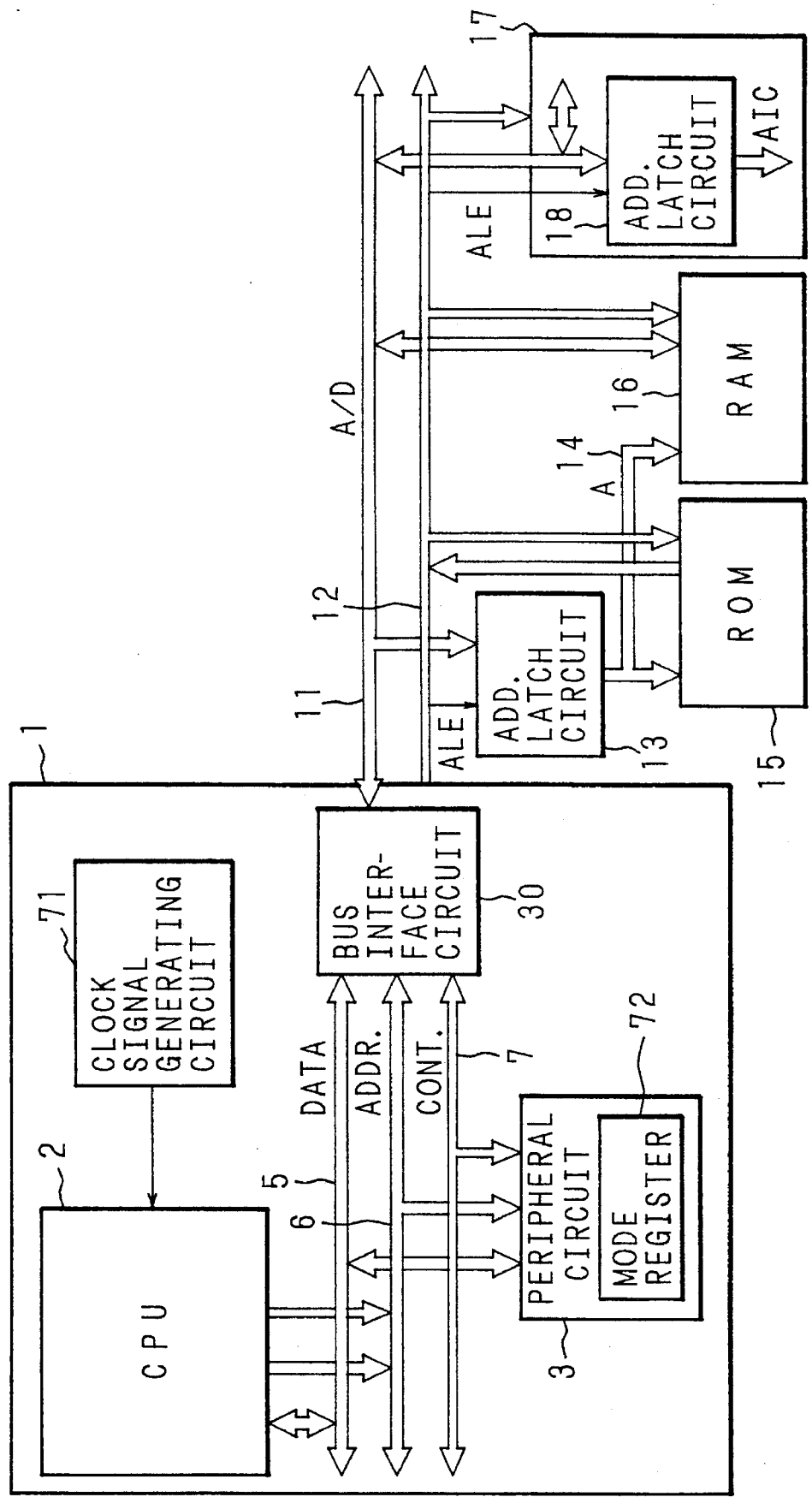
FIG. 4 is a block diagram showing a microcomputer according to a first embodiment of the present invention and external circuits.

FIG. 4 is a block diagram showing a microcomputer according to the present invention and external circuits connected to the microcomputer. The microcomputer is indicated at the numerical reference 1. The microcomputer 1 comprises a CPU 2 which receives a clock signal which is generated by a clock signal generating circuit 71, decodes a predetermined program and controls a peripheral device in accordance with the content of the program. The microcomputer 1 also comprises a peripheral circuit 3 which includes circuits such as a mode register 72, an internal memory (ROM, RAM, and so on), a timer and an A-D conversion circuit. A bus interface circuit 30 which connects an internal bus and an external bus is also provided in the microcomputer 1. Among the CPU 2, the peripheral circuit 3 and the bus interface circuit 30, a data signal is transferred through an internal data bus 5, an address signal is transferred through an internal address bus 6, and a control signal is transferred through an internal control signal bus 7.

A ROM 15, a RAM 16 and an exclusive use IC 17 which includes an address latch circuit 18 is disposed outside of the microcomputer 1. The address/data signal outputted from the bus interface circuit 30 is supplied to an address latch circuit 13 through an external address/data bus 11 so that an address signal A alone is provided to the ROM 15 and the RAM 16 through the external address bus 14. This address/data signal is supplied directly to the exclusive use IC 17. In FIG. 4, the symbol AIC indicates the address signal which is separated by the address latch circuit 18.

The control signal includes an address latch enable signal ALE for controlling a timing of latching the address signal in the address latch circuit 13, a write signal #WR (a first control signal) for controlling a timing of writing data, a read signal #RD for controlling a timing of reading data and a write signal #SWR (a second control signal) for the exclusive use IC 17. The control signal is supplied to the bus interface circuit 30 through the internal control signal bus 7, and thereafter further to the ROM 15, the RAM 16 and the exclusive use IC 17 through an external control signal bus 12.

Figure 5:
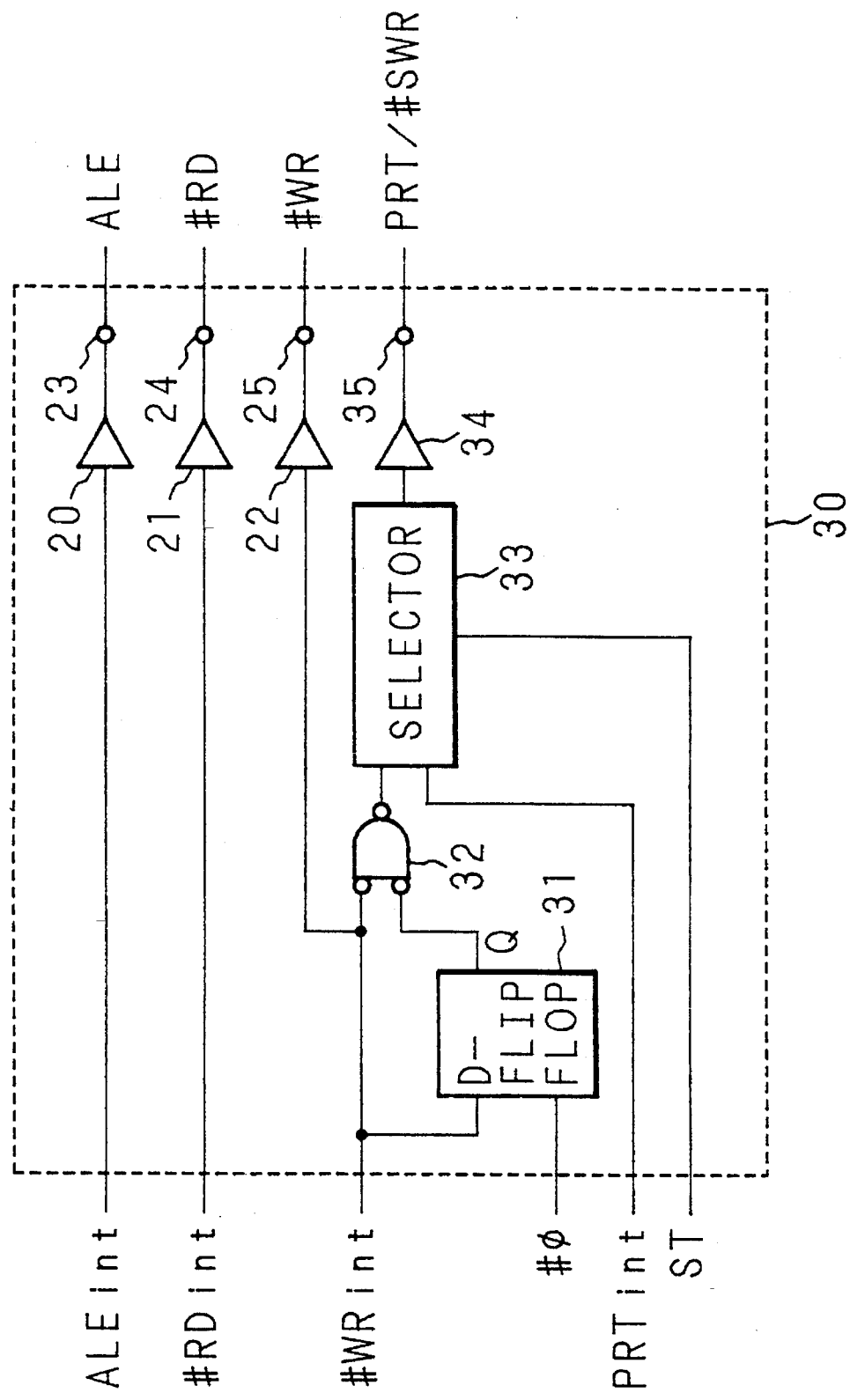
FIG. 5 is a circuitry diagram showing an essential part of a bus interface circuit of the first embodiment.

FIG. 5 is a circuitry diagram showing an essential part of the bus interface circuit 30 shown in FIG. 4, and particularly, showing the part related to outputting of the control signals.

The bus interface circuit 30 includes output buffers 20, 21, 22 and 34 and output terminals 23, 24, 25 and 35 which are respectively connected to the output buffers 20, 21, 22 and 34. Being located upstream to the output buffers 22 and 34 are a D flip-flop 31 which receives an internal write signal #WRint as a data input thereto and a inverted clock signal #ø of the clock signal as a clock input thereto, an OR gate 32 which receives the internal write signal #WRint outputted from the D flip-flop 31, and a selector 33 which selects and outputs either an output signal of the OR gate 32 or a port output signal PRTint in accordance with a select signal ST (a first timing signal). To select one of the out put signal of the OR gate 32 and the port output signal PRTint, the select signal ST is supplied by a mode register 72 in response to a command from the CPU 2, and fed to the bus interface circuit 30 through the internal control signal bus 7.

An internal address latch enable signal ALEint, an internal read signal #RDint and an internal write signal #WRint are supplied to the output buffers 20, 21 and 22, respectively. An output signal of the selector 33 is supplied to the output buffer 34. Through the output buffers 20, 21, 22 and 34, the signals are outputted to the external control signal bus 12 from output terminals 23, 24, 25 and 35 as the address latch enable signal ALE, the write signal #WR and the write signal #SWR, respectively.

The write signal #WR is supplied to a write signal input terminal of the external RAM 16 while the write signal #SWR is supplied to an input terminal of the externally provided exclusive use IC 17. As in the conventional microcomputer, the address latch enable signal ALE is provided to the address latch circuits 13 and 18, and the read signal #RD is provided to the ROM 15, the RAM 16 and the exclusive use IC 17.

Figure 6:
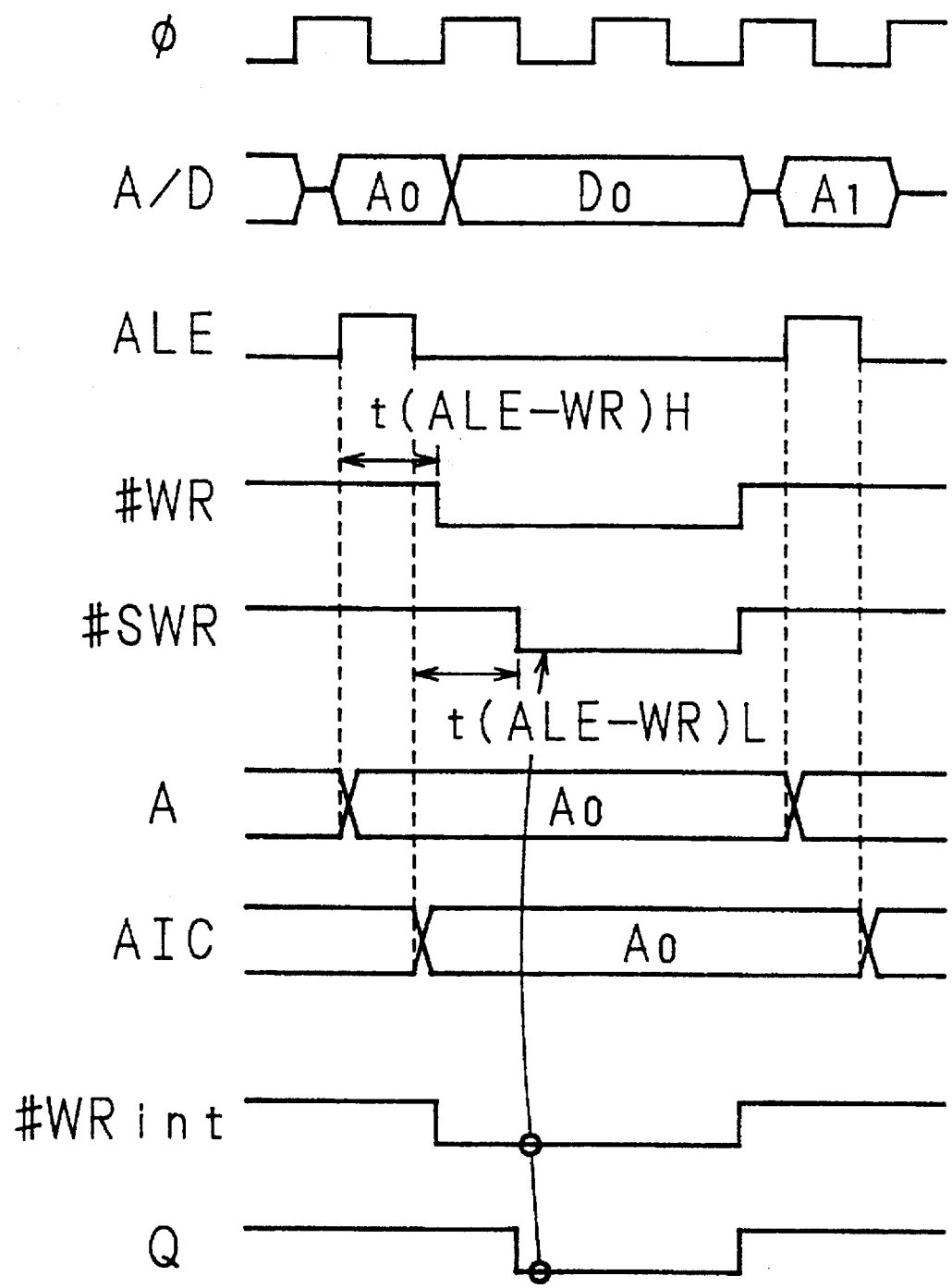
FIG. 6 is a timing chart showing operations in the First embodiment.

Next, operations of the bus interface circuit 30 will be described. FIG. 6 is a timing chart showing operations of the microcomputer of the first embodiment.

In FIG. 6, indicated at the symbol ø is the clock signal. The address/data signal is a signal in which address signals A0, A1, . . . and data signals D0, . . . alternately appear. The address latch enable signal ALE rises to "H" level when the address/data signal switches to the address signal.

The D flip-flop 31 accepts the internal write signal #WRint as data thereto when the clock signal ø is at "H" level. Upon a fall of the clock signal ø to "L" level, the D flip-flop 31 outputs the data as its output signal Q. The OR gate 32 outputs "L" level only when the output signal Q of the D flip-flop 31 and the internal write signal #WRint are both at "L" level. When the output signal of the gate 32 is selected by the selector 33, an output signal of the OR gate 32 is outputted as the write signal #SWR from the output terminal 35 through the output buffer 34.

Figure 1:
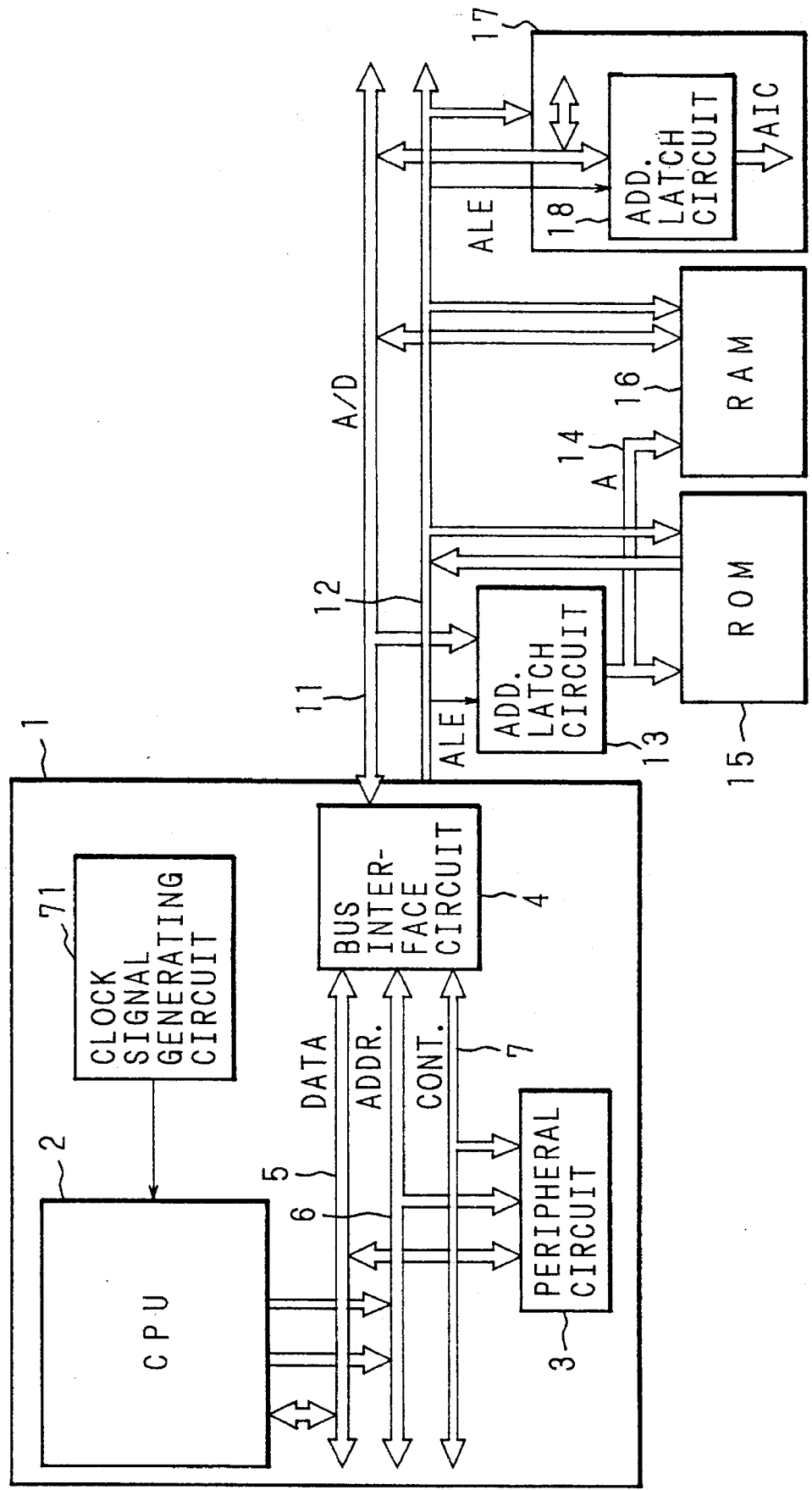
FIG. 1 is a block diagram showing a conventional microcomputer connected with external circuits.
Figure 2:
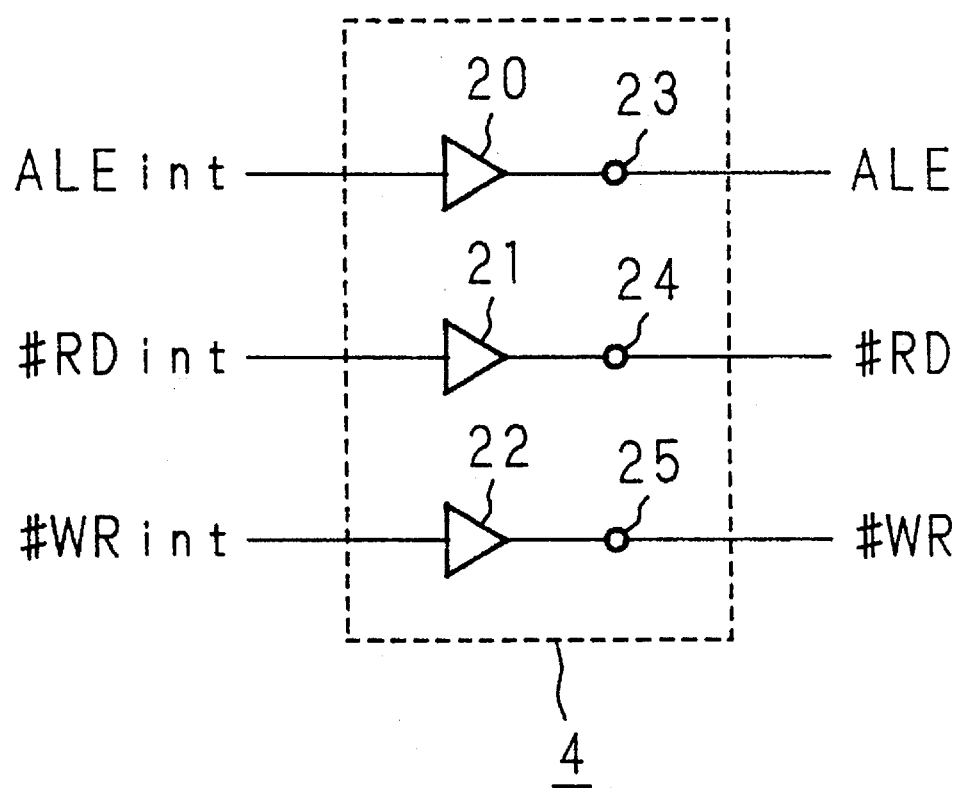
FIG. 2 is a circuitry diagram showing an essential part of a bus interface circuit shown in FIG. 1.
Figure 3:
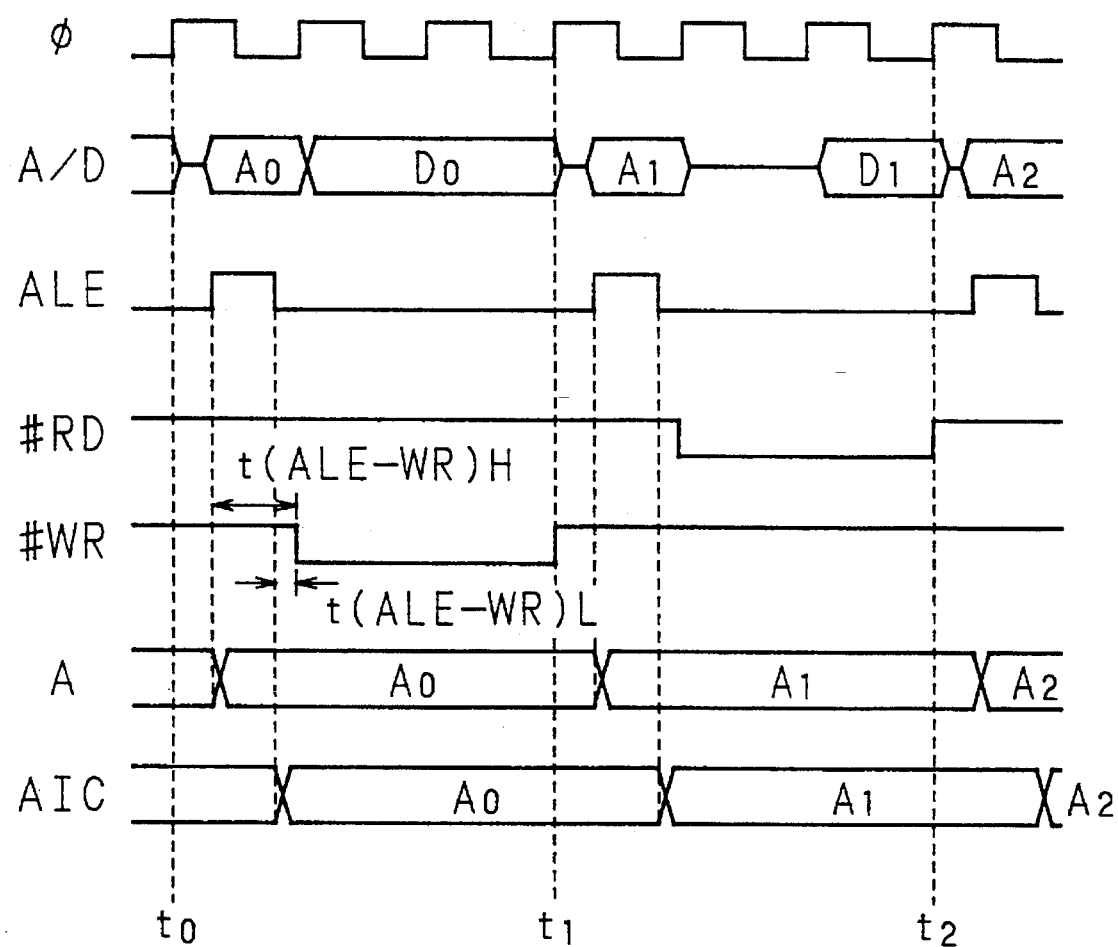
FIG. 3 is a timing chart showing operations of the bus interface circuit shown in FIG. 1.

Since the write signal #SWR is connected to a write signal input terminal of the exclusive use IC 17, it is possible to increase a period t(ALE-WR)L longer than the corresponding period of FIG. 3 by half a cycle of the clock signal ø. With respect to the write signal #WR outputted from the output terminal 25, since the write signal #WR is supplied to a write signal input terminal of the RAM 16 as in the conventional microcomputer, there is no chance that the high operation speed of the RAM 16 will be deteriorated.

As heretofore described, in the embodiment, even when the two types of elements which the access time of the write signal #WR is different are connected to the same external bus, owing to use of the two different types of write signals which correspond to the respective elements, there is no need to delay the overall bus cycle in accordance with the timing for the slower element. As a result, the elements can operate at a higher speed than in the conventional microcomputer.

The output terminal 35 is not an additional new terminal but is the terminal already provided to output the port signal. When the external exclusive use IC 17 and the write signal #SWR is not necessary, when the state of the select signal ST is set reverse by the CPU 2 so that the selector 33 selects the port output signal PRTint and the output terminal 35 serves as a port terminal. Thus, the terminals of the microcomputer can be fully utilized. The microcomputer can maintain the flexibility as the microcomputer.

Second Embodiment

Figure 7:
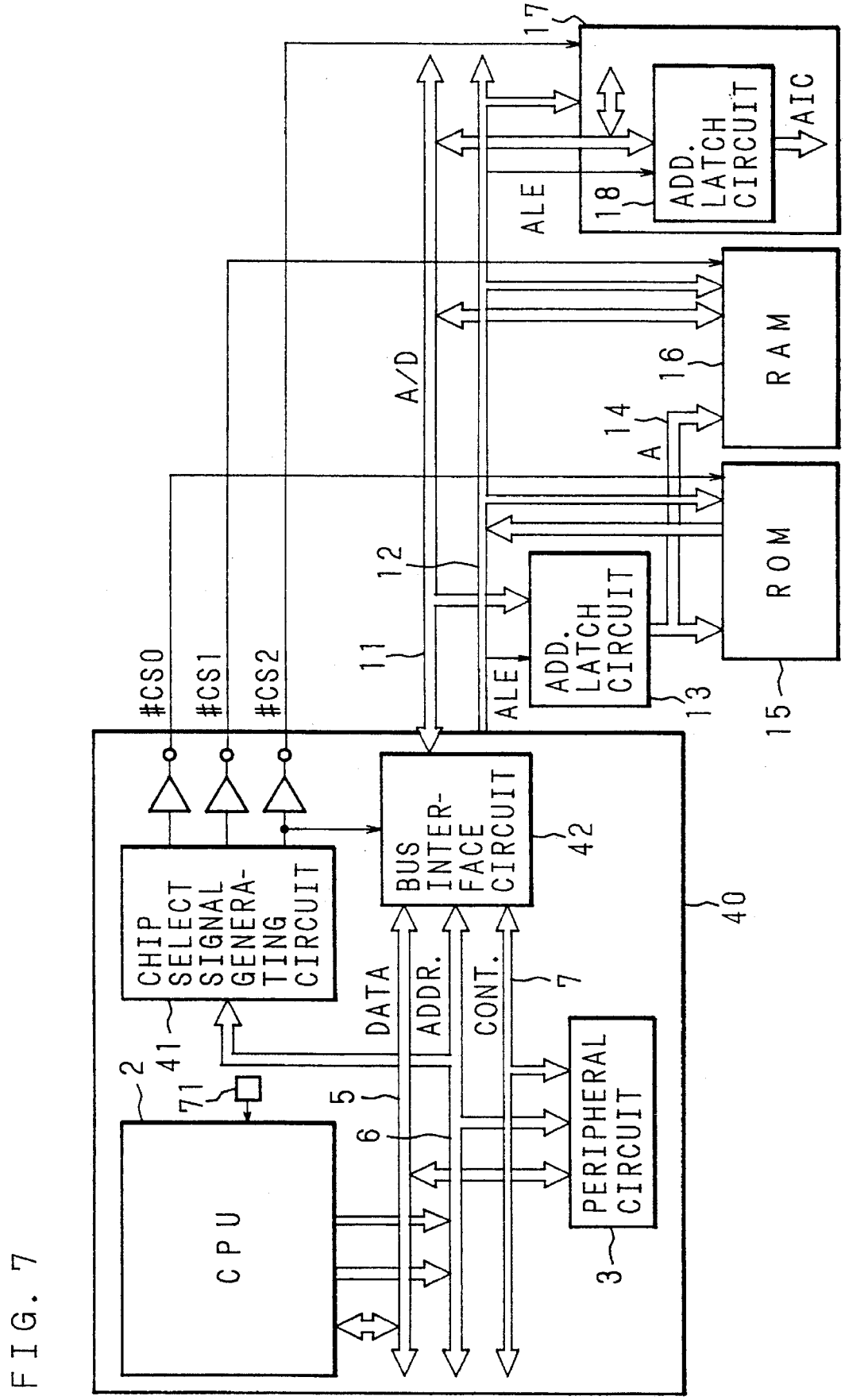
FIG. 7 is a block diagram showing a microcomputer according to a second embodiment of the present invention and external circuits.

FIG. 7 is a block diagram showing a microcomputer according to a second embodiment of the present invention and external circuits connected to the microcomputer. In the second embodiment, a microcomputer 40 comprises a chip select signal generating circuit 41 which generates a chip select signal for selecting one of the ROM 15, the RAM 16 and the exclusive use IC 17. Data required for generating the chip select signal exists in a specified address space of the address signal which is transferred from the internal address bus 6. Decoding the address signal, the chip select generating circuit 41 outputs one of a plurality of chip select signals (three chip select signals in FIG. 7) as "L" level. Since the external circuits are the ROM 15, the RAM 16 and the exclusive use IC 17, the chip select signals for selecting the ROM 15, the RAM 16 and the exclusive use IC 17 are indicated respectively at the symbols #CS0, #CS1 and #CS2 in FIG. 7 for clarity of illustration. In addition to the data signal, the address signal and the control signal, the chip select signal #CS2 for selecting the exclusive use IC 17 is supplied to a bus interface circuit 42 of the second embodiment. The signal outputted by the bus inter face circuit 42 to the external control signal bus 12 includes the write signal #SWR which is supplied to the write signal input terminal of the exclusive use IC 17.

Figure 8:
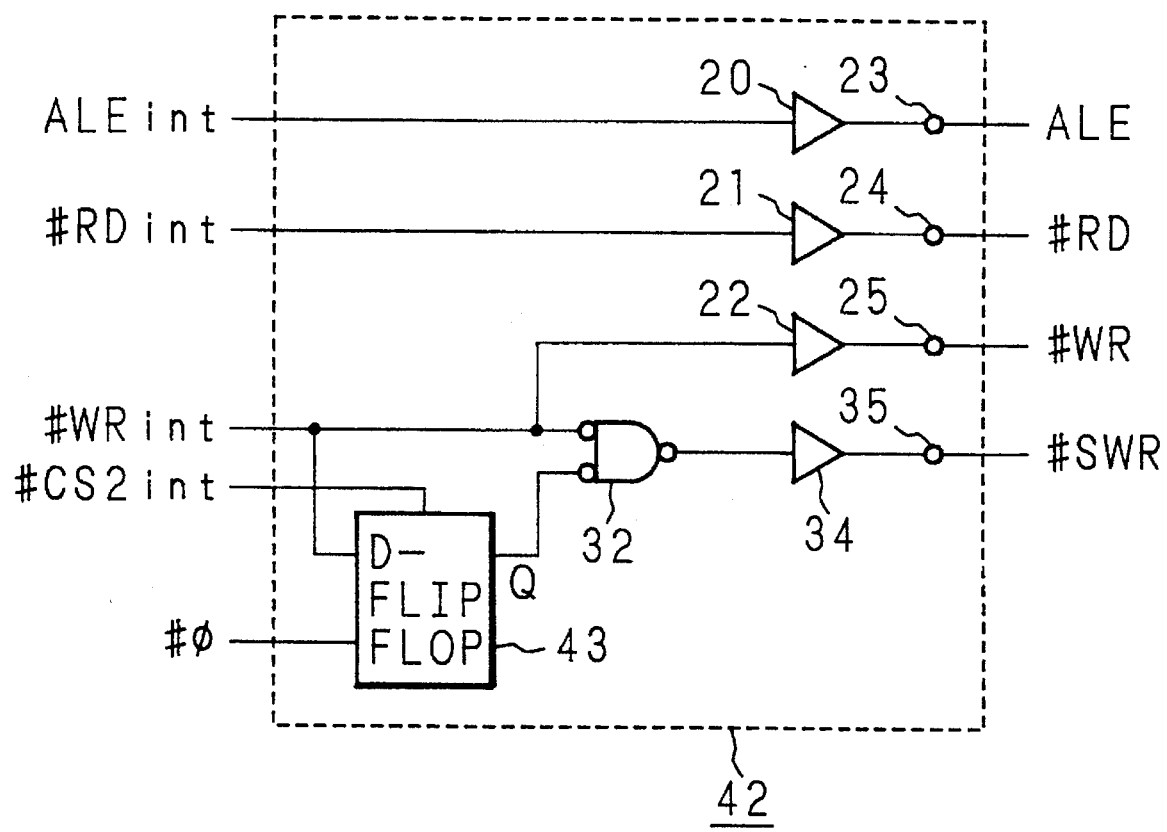
FIG. 8 is a circuitry diagram showing an essential part of a bus interface circuit of the second embodiment.

FIG. 8 is a circuitry diagram showing an essential structure of the bus interface circuit 42 shown in FIG. 7, and particularly, showing the part related to outputting of the control signals. In the second embodiment, the D flip-flop 31 shown in FIG. 5 is replaced with a D flip-flop 43 which receives the internal write signal #WRint as a data input thereto, the reversed clock signal #ø as a clock input thereto and the chip select signal #CS2 as a set input thereto. When the chip select signal #CS2 is fed to the D flip-flop 43 through the address bus 6 and stays at "H" level, that is, when the address space of the chip select signal #CS2 is left not selected, an output signal Q is at "H" level. To the contrary, when the chip select signal #CS2 is at "L" level, the D flip-flop 43 operates as a D flip-flop.

With the selector 33 omitted, the output signal of the OR gate 32 is directly outputted to the output buffer 34. As in the first embodiment, the write signal #WR is supplied to the write signal input terminal of the RAM 16 which is structured as a high-speed memory, while the write signal #SWR is supplied to the write signal input terminal of the exclusive use IC 17. In FIG. 8, parts similar to those previously described with reference to FIGS. 4 and 5 are denoted by the same reference numerals, and will not be described below.

Figure 9:
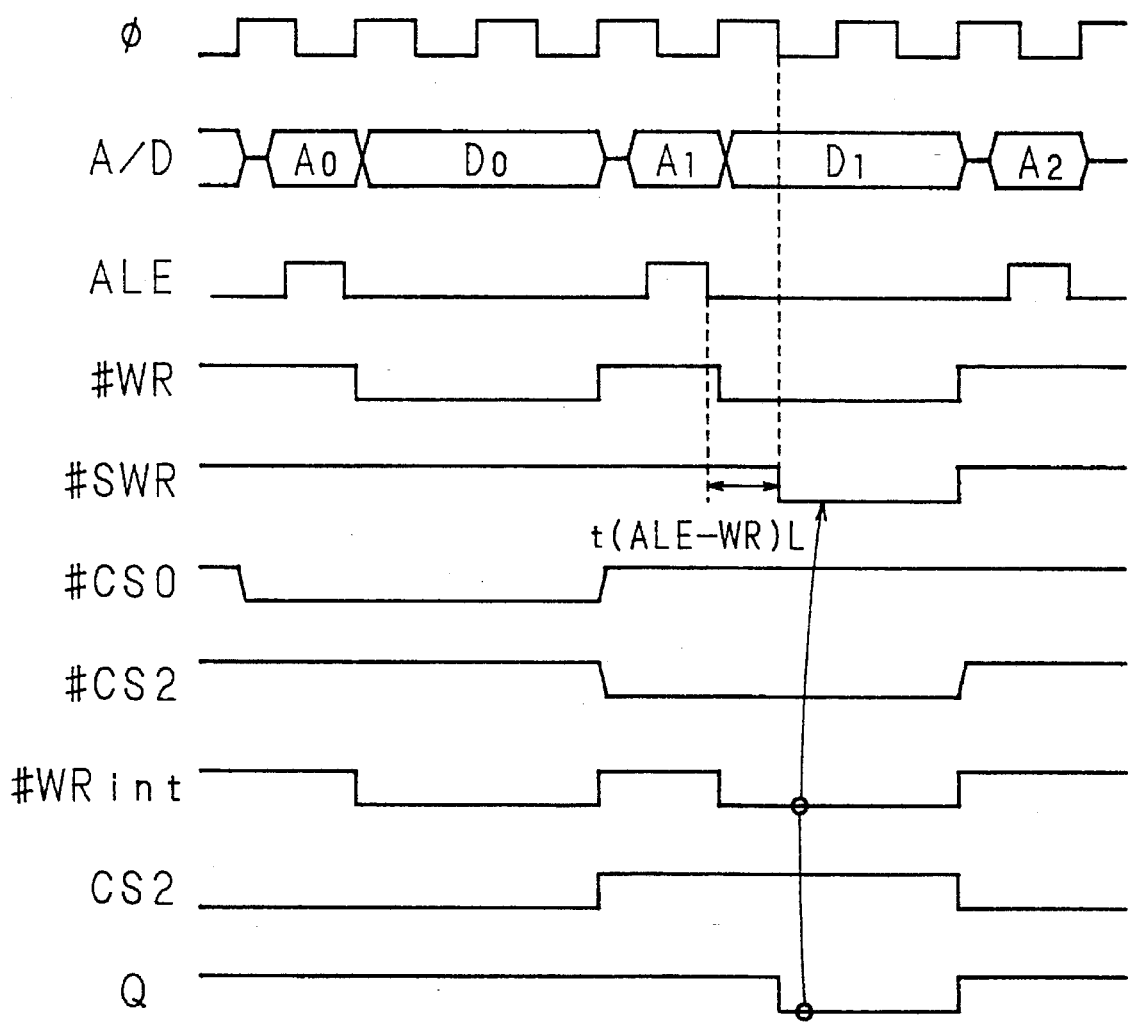
FIG. 9 is a timing chart showing operations in the second embodiment.

FIG. 9 is a timing chart showing operations of the bus interface circuit 42 of the second embodiment. Here, the chip select signals #CS0 and #CS2 stay at "L" level (i.e., active) in response to the address signals A0 and A1, respectively. That is, the chip select signals #CS0 and #CS2 exist in the address spaces which correspond to the address signals A0 and A1, respectively.

In the initial portion of FIG. 9, i.e., in the bus cycle which corresponds to the address signal A0, although the write signal #WR is outputted, the chip select signal #CS2 is at "H" level. Therefore, "H" level appears at the output signal Q. Hence, the write signal #SWR passed through the OR gate 32 remains at "H" level. In the subsequent portion of FIG. 9, i.e., in the bus cycle which corresponds to the address signal A1, since the chip select signal #CS2 is at "L" level. The D flip-flop 43 forms the output signal Q by delaying the internal write signal #WRint by half the cycle of the clock signal ø. Hence, as shown in FIG. 9, the write signal #SWR changes to "L" level at the next fall of the clock signal ø. In this manner, by activating the chip select signal #CS2 for selecting the exclusive use IC 17, it is possible to generate the write signal #SWR for accessing only the exclusive use IC 17.

As described above, in the second embodiment, since the write signal #SWR is outputted only when a specified address space is accessed by the CPU 2, the write signal #SWR is outputted substantially only exclusively when the exclusive use IC 17 is accessed by the CPU 2. Hence, as in the first embodiment, even when the two types of elements which the access time of the write signal #WR is different are connected to the same external bus, owing to use of the two different types of write signals which correspond to the respective elements, there is no need to delay the overall bus cycle in accordance with the timing for the slower element. As a result, the elements can operate at a higher speed than in the conventional microcomputer.

In general, accessing to the exclusive use IC 17 by the CPU 2 is drastically less frequent than accessing to the ROM 15 or the RAM 16 by the CPU 2. In the second embodiment, the write signal #SWR remains at "H" level when the ROM 15 or the RAM 16 is to be accessed. Hence, it is possible to suppress an increase in the consumption power and radiation of a noise due to unwanted outputting of the write signal #SWR.

Third Embodiment

Figure 10:
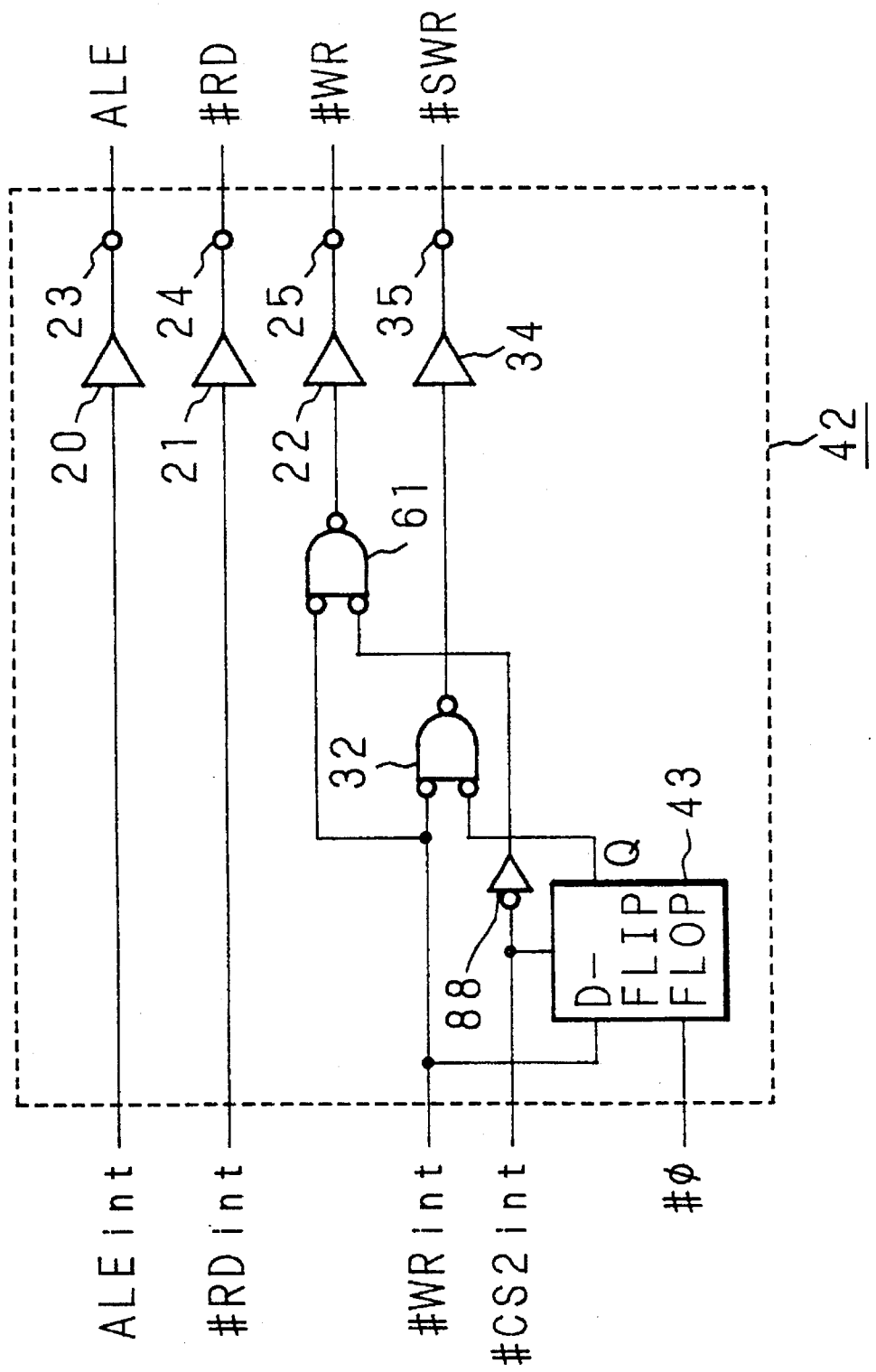
FIG. 10 is a circuitry diagram showing an essential part of a bus interface circuit of a third embodiment of the present invention.

Although the precedent embodiments allow that the write signal #WR to stay at "L" level during the "H" level period of the chip select signal #CS2, as shown in FIG. 10, outputting of the write signal #WR may be prohibited while the chip select signal #CS2 is at "L" level. This is achieved by inserting an OR gate 61 before the output buffer 22 and supplying the chip select signal #CS2 to one input terminal of the OR gate 61. When structured so that the exclusive use IC 17 includes a circuit which generates a signal which corresponds to the chip select signal #CS2, the microcomputer is applicable to a microcomputer which does not have a function to output the chip select signal.

Fourth Embodiment

The second and the third embodiments are related to a microcomputer which has a function to output the chip select signal. The same effect as that of the second embodiment is otherwise attainable by providing a register bit which can be rewritten by the CPU 2. In this case, the level of the write signal #SWR is set depending on the state of the register bit, and the register bit is set or reset before and after accessing the exclusive use IC 17.

Figure 11:
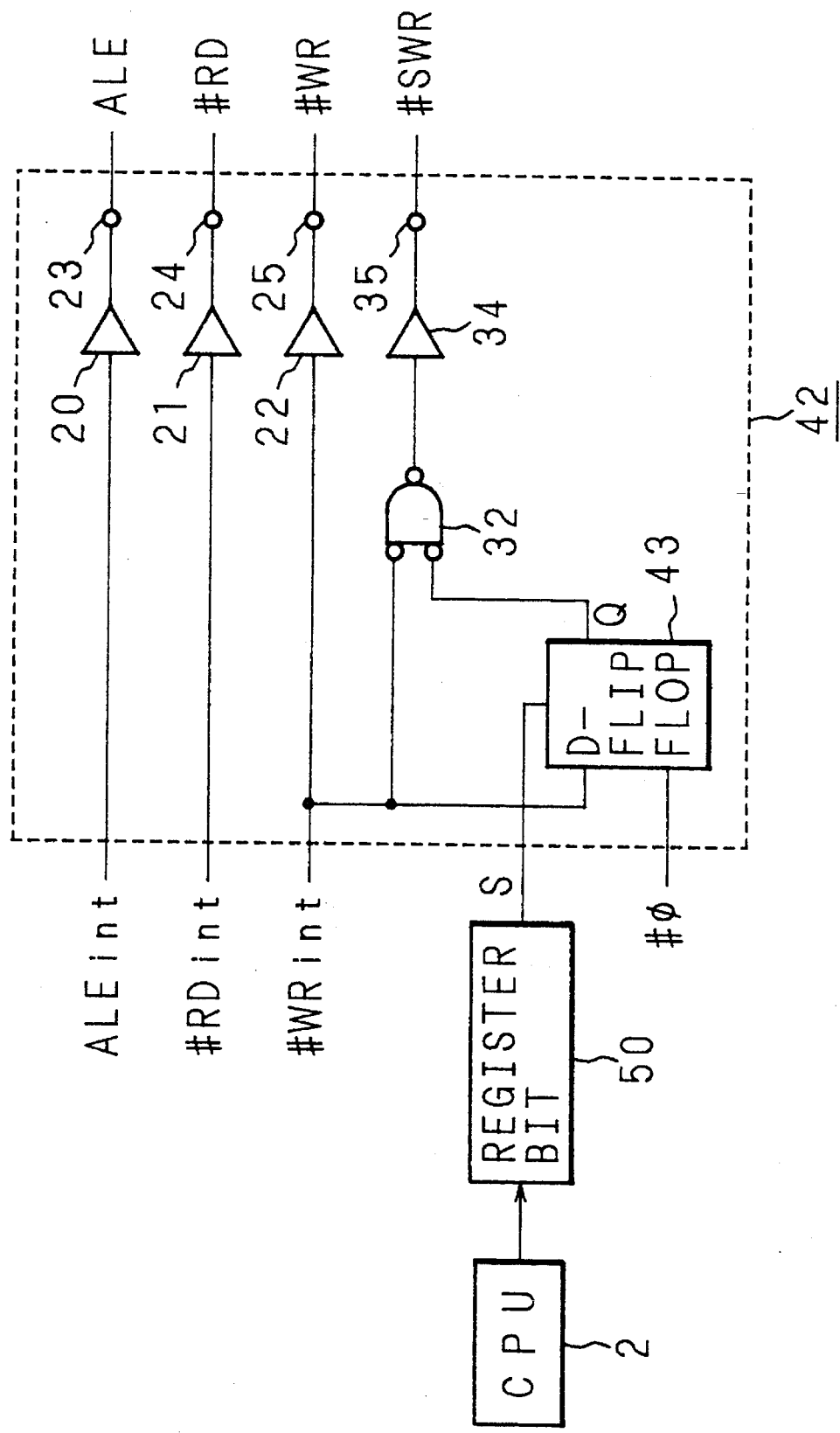
FIG. 11 is a circuitry diagram showing an essential part of a bus interface circuit of a fourth embodiment of the present invention.

FIG. 11 is a circuitry diagram showing an essential structure of the bus interface circuit 42 according to the fourth embodiment, and particularly, showing the part related to outputting of the control signal. In the fourth embodiment, a register bit 50 is provided which generates a signal which replaces the chip select signal #CS2. In accordance with data set by the CPU 2, the register bit 50 provides the D flip-flop 43 with a control signal S (a third timing signal) which changes to "H" level to activate the D flip-flop 43. In FIG. 11, parts similar to those previously described with reference to FIG. 8 are denoted by the same reference numerals, and will not be described below.

Figure 12:
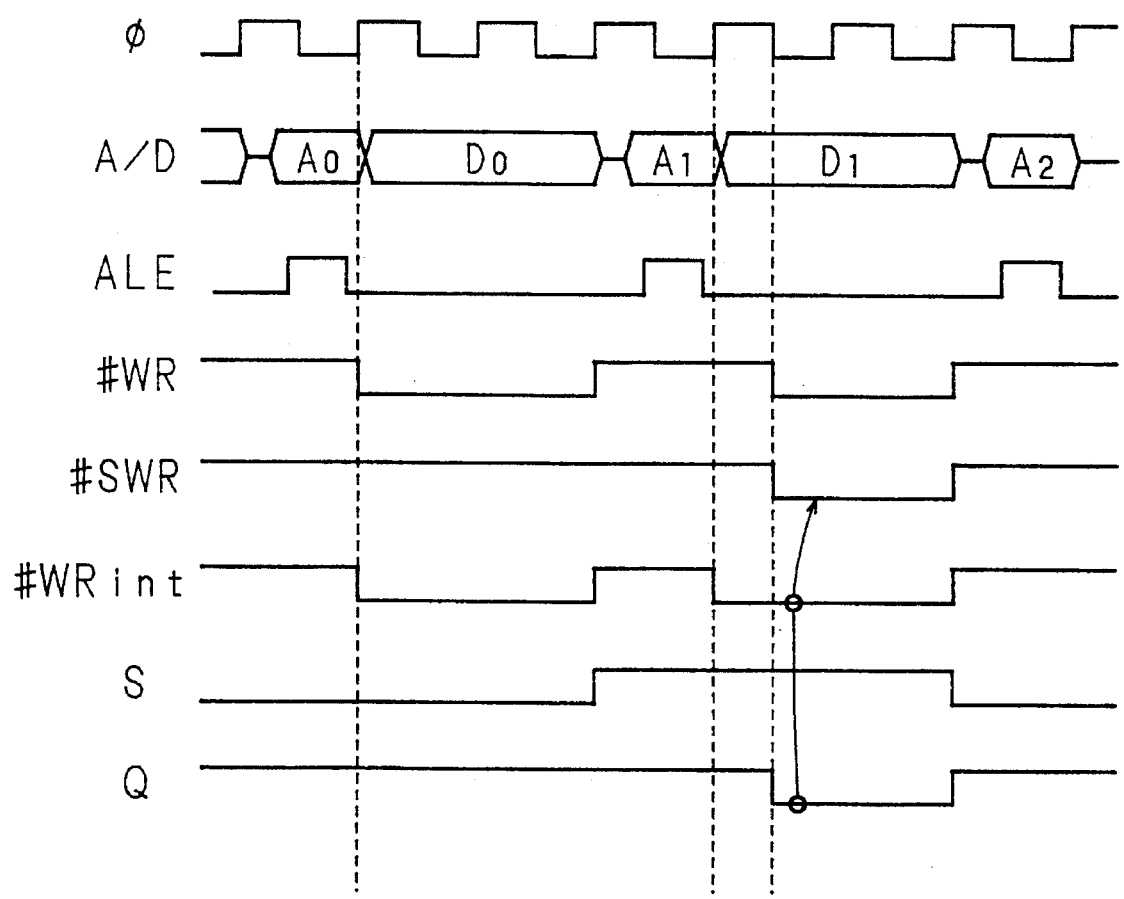
FIG. 12 is a timing chart showing operations in the fourth embodiment.

FIG. 12 is a timing chart showing operations in the structure shown in FIG. 11. The CPU 2 has a command which demands to write "1" in the register bit 50 immediately before accessing the exclusive use IC 17. When the exclusive use IC 17 is not to be accessed, the output signal Q is at "H" level because the control signal S is at "L" level, although the write signal #WR is outputted. Hence, the write signal #SWR passed through the OR gate 32 remains at "H" level.

When the exclusive use IC 17 is to be accessed, the D flip-flop 48 is activated since the control signal S is at "H" level. That is, the output signal Q delayed the internal write signal #WRint by half the cycle of the clock signal ø is outputted. Therefore, the write signal #SWR drops to "L" level at the next fall of the clock signal ø. In this manner, by activating the control signal S active when the exclusive use IC 17 is to be accessed, it is possible to generate the write signal #SWR for accessing only the exclusive use IC 17. In addition, by constructing the CPU 2 to demand writing of "O" in the register bit 50 after accessing the exclusive use IC 17, the control signal S changes to "L" level and the D flip-flop 43 is fixed in the set state, and therefore, the write signal #SWR is also fixed at "H" level.

In the fourth embodiment as well, it is possible to output the write signal #SWR For every accessing to the exclusive use IC 17. Hence, the same effect as that of the second embodiment is attained.

Fifth Embodiment

Figure 13:
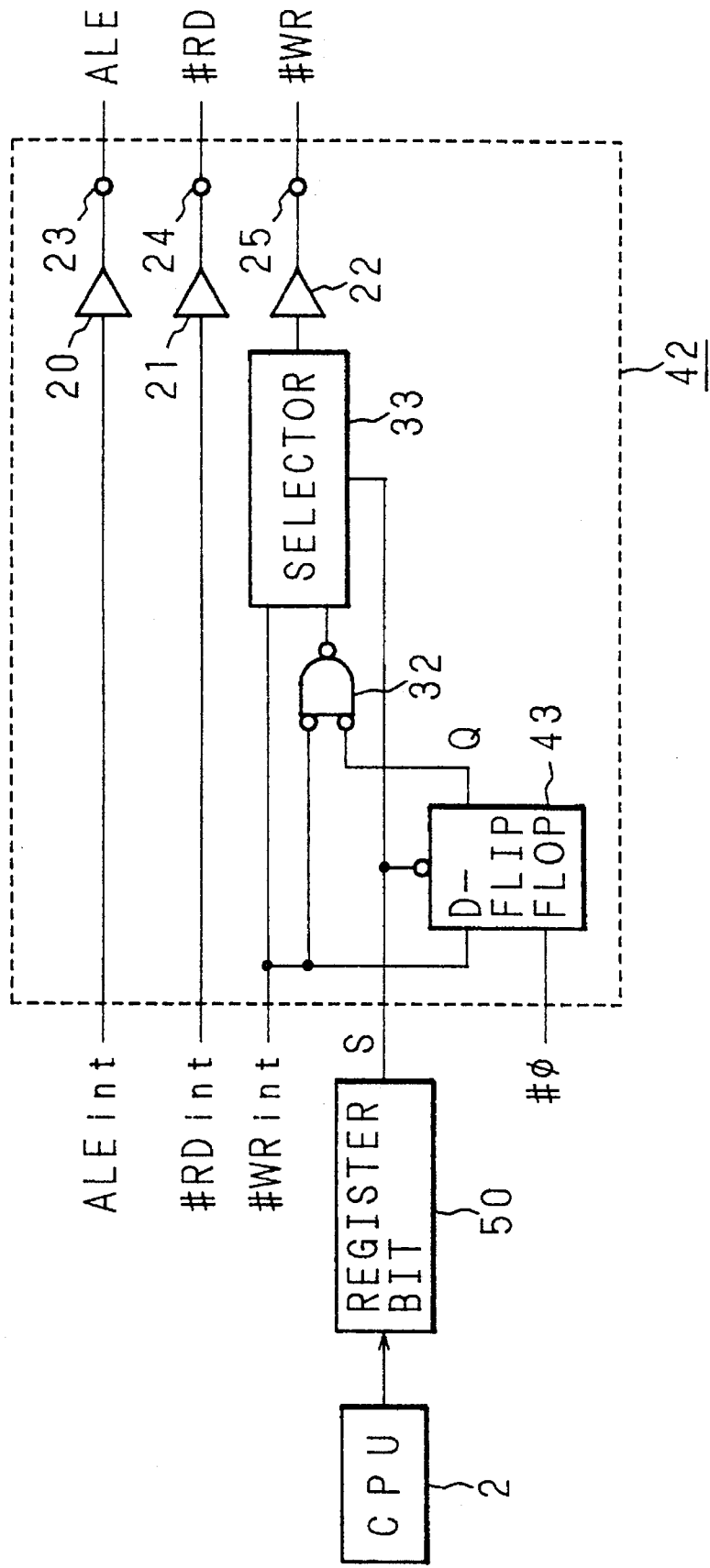
FIG. 13 is a circuitry diagram showing an essential part of a bus interface circuit of a fifth embodiment of the present invention.

Although in the embodiment of FIG. 11 the write signals #WR and #SWR are outputted from different terminals, the bus interface circuit 42 may be otherwise structured as shown in FIG. 13. In FIG. 13, the selector 33 is disposed upstream prior to the output buffer 22. Here, the selector 33 receives the write signal #WR and the output signal of the OR gate 32 as input signals thereto. In response to the control signal S supplied from the register bit 50, the selector 33 selectively outputs one of the write signal and the output signal of the OR gate 32 (i.e., the write signal #SWR).

In such a structure, it is possible to change the "H" level periods of the respective write signals in accordance with the address signals A0 and A1 on the same signal line. This allows to use only one write signal output terminal and to generate write signals as desired which are suitable to the respective elements.

Sixth Embodiment

Next, the embodiment which is capable of applying a plurality of external bus widths will be described.

Figure 14:
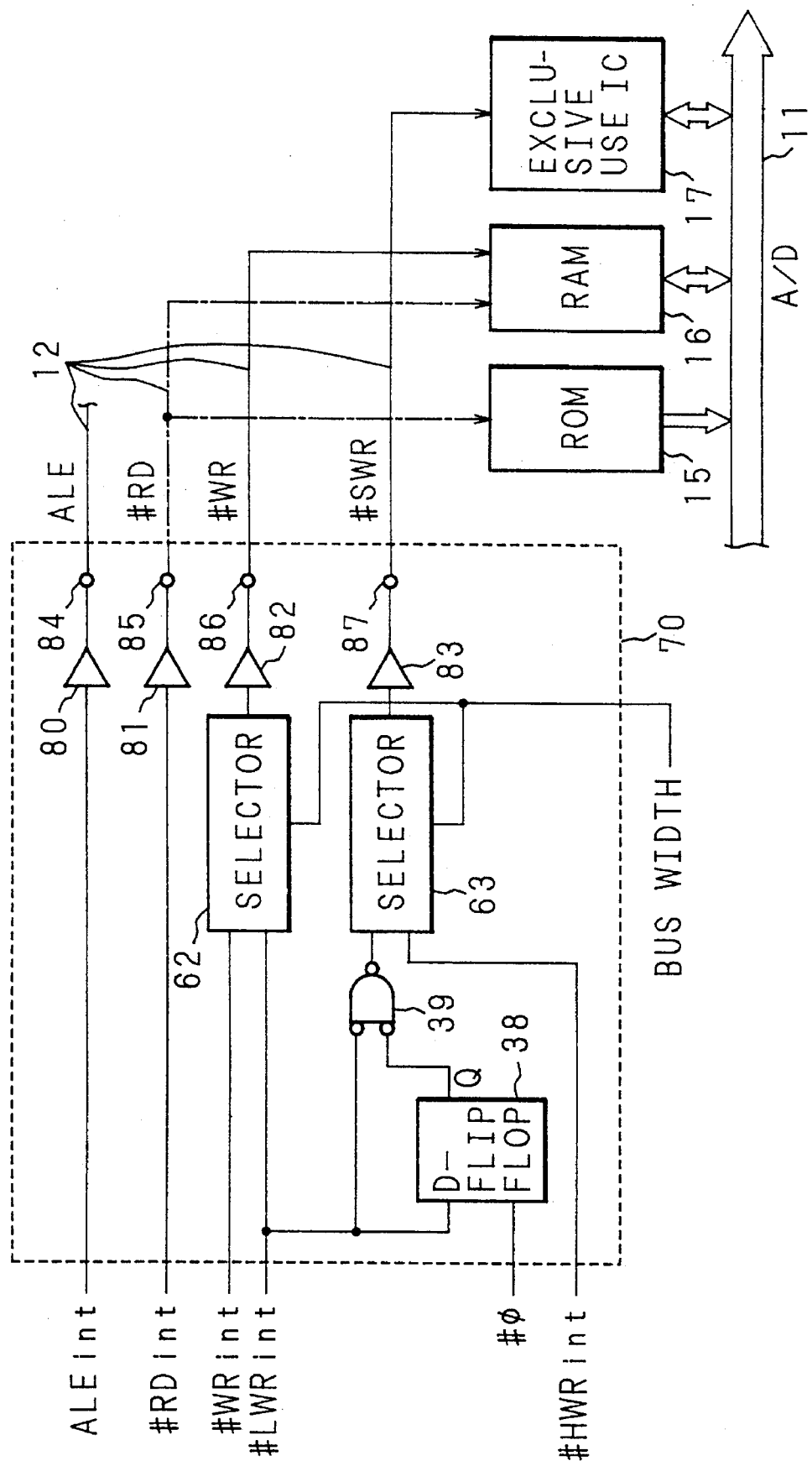
FIG. 14 is a block diagram showing an essential part of a bus interface circuit of a sixth embodiment of the present invention and external circuits.

FIG. 14 is a block diagram showing an essential part of a bus interface circuit of a sixth embodiment of the present invention and external circuits connected to the microcomputer. In the sixth embodiment, a bus interface circuit 70 comprises output buffers 80, 81, 82 and 83 and output terminals 84, 85, 86 and 87 which are connected to the output buffers 80, 81, 82 and 83, respectively. The bus interface circuit 70 also comprises a D flip-flop 38 which receives the internal write signal #WRint as a data input thereto and the inverted clock signal #ø as a clock input thereto. The bus interface circuit 70 further comprises an OR gate 39 which receives an output signal of the D flip-flop 38 and the internal write signal #WRint. Also provided in the bus interface circuit 70 is a selector 62 which selects and outputs one of the internal write signal #WRint and an even address internal write signal #LWRint (a third control signal) in accordance with a bus width designate signal BUSWIDTH (a fourth timing signal) which is designated by the CPU 2. There is another selector 63 provided in the bus interface circuit 70 for selecting and outputting one of the output of the OR gate 39 and an odd address internal write signal #HWRint (a fourth control signal) in accordance with the bus width designate signal BUSWIDTH.

An output signal of the selector 62 is supplied to the output buffer 82 while an output signal of the selector 63 is supplied to the output buffer 83. The bus width designate signal BUSWIDTH is outputted by a mode register in response to a command from the CPU 2, and supplied to the bus interface circuit 70 through the internal control signal bus 7.

The internal address latch enable signal ALEint and the internal read signal #RDint are supplied to the output buffers 80 and 81, respectively, and outputted at the output terminals 84 and 85 to the external control signal bus 12 as the address latch enable signal ALE and the read signal #RD, respectively. In the structure of FIG. 14, in response to the bus width designate signal BUSWIDTH, the internal write signal #WRint is selected by the selector 62 and outputted at the output terminal 86 through the output buffer 82 to the external control signal bus 12 as the write signal #WR. In accordance with the bus width designate signal BUSWIDTH, the selector 63 selects the signal which is obtained by flip-flopping the internal write signal #WRint so that the selected signal is outputted as the write signal #SWR at the output terminal 87 through the output buffer 83 to the external control signal bus 12.

In the sixth embodiment, the data bus width within the microcomputer is 16 bits, and addresses are assigned in such a manner that 8-bit data exist in a parallel relation to each other. More specifically, 1 byte consisting of the 0–7 bits of low order are used for the even address internal write signal #LWRint and 1 byte consisting of the 8–15 bits of high order are used for the odd address internal write signal #HWRint.

In the structure of FIG. 14, the internal bus of the microcomputer 1 has a width of 16 bits and the external bus of the microcomputer 1 has a width of 8 bits. Since the write signal #WR requires only an 8-bit width when the external bus of the memory has a width of 8 bits, the remaining 8 bits are used for the external exclusive use IC 17 which has an 8-bit width, because the number of the terminals is limited and because accessing to the external exclusive use IC 17 is less frequent.

In some of so-called 16-bit microcomputers having a data bus width of 16 bits and capable of processing 16-bit width data, it is possible to select the external bus width between 16 bits and 8 bits. The bus interface circuit 70 having such a structure as that described in the sixth embodiment is applicable to this kind of a microcomputer. When the external bus width is 16 bits, the microcomputer can operate twice faster than a microcomputer in which the external bus width is 8 bits.

Figure 15:
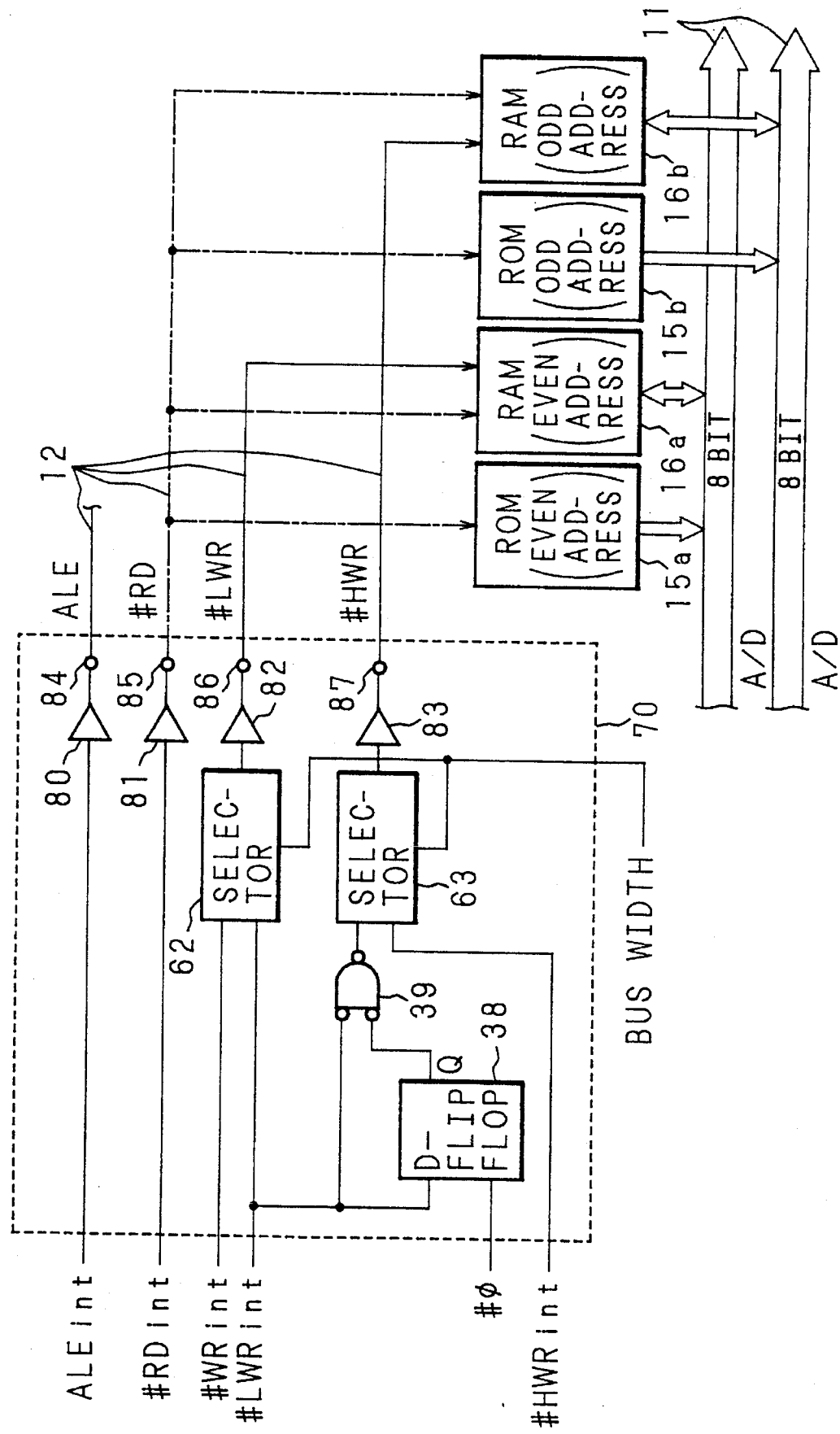
FIG. 15 is a block diagram showing an essential part of the bus interface circuit shown in FIG. 14 is connected with a 16-bit width external bus.

FIG. 15 is a block diagram showing an essential structure of the bus interface circuit 70 shown in FIG. 14 is connected with a 16-bit width external bus. Since an external memory generally has an 8-bit width even when the external bus is a 16-bit width bus, different memories are used for the eight bits of low order and the eight bits of high order. For example, two 8-bit ROMs 15a, 15b and two 8-bit RAMs 16a, 16b are connected to each other to use the ROMs and the RAMs each as a 16-bit width memory. The structure of the bus interface circuit 70 is the same as that shown in FIG. 14 except for the states of the bus width designate signal BUSWIDTH supplied to the selectors 62 and 63. That is, the selector 62 selects and outputs the even address internal write signal #LWRint, while the selector 63 selects and outputs the odd address internal write signal #HWRint.

The even address internal write signal #LWRint changes to "L" level at writing of an even address so that an even address write signal #LWR is supplied to a write signal input terminal of the RAM 16a which corresponds to the 0–7 bits of low order. The odd address internal write signal #HWRint changes to "L" level at writing of an odd address so that an odd address write signal #HWR is supplied to a write signal input terminal of the RAM 16b which corresponds to the 8–15 bits of high order.

Addresses are assigned to the 16-bit width data bus of the microcomputer 1 in such a manner that 8-bit data exist in a parallel relation to each other. More particularly, 1 byte consisting of the 0–7 bits of low order are used for the even address internal write signal #LWRint and the 8–15 bits of high order are used for the odd address internal write signal #HWRint.

When there is only one path provided for the write signal #WR to the RAM (16a, 16b), even when writing only in the RAM (16b) for the eight bits of high order is necessary, undefined data will be written in the RAM (16a) for the eight bits of low order as well. To avoid this, the outputted write signal #WR must be separated for an even address side and an odd address side. In the sixth embodiment, having such a structure as described above, it is possible to output different write signals from the bus interface circuit 70 for the even address side and the odd address side.

FIG. 16 shows signals to be outputted from the output terminals 86 and 87 of FIG. 14 and 15 in the cases where the external buses of 8-bit and a 16-bit widths are employed. Where the external bus is an 8-bit width bus, the write signal #WR is outputted at the output terminal 86 while the write signal #SWR is outputted at the output terminal 87. Where the external bus is an 16-bit width bus, the even address write signal #LWR is outputted at the output terminal 86 while the odd address write signal #HWR is outputted at the output terminal 87.

Thus, the sixth embodiment Feasible to both an external bus of an 8-bit width and an external bus of a 16-bit width. More specifically to be precise, the write signal #WR and the write signal #SWR are outputted in the case where the data bus width is 8-bits and the exclusive use IC 17 is connected to the microcomputer, whereas the even address write signal #LWR and the odd address write signal #HWR are outputted in the case where the data bus width is 16-bits and the exclusive use IC 17 is not connected to the microcomputer. The sixth embodiment is also advantageous since the output terminals are used effectively.

Seventh Embodiment

Figure 17:
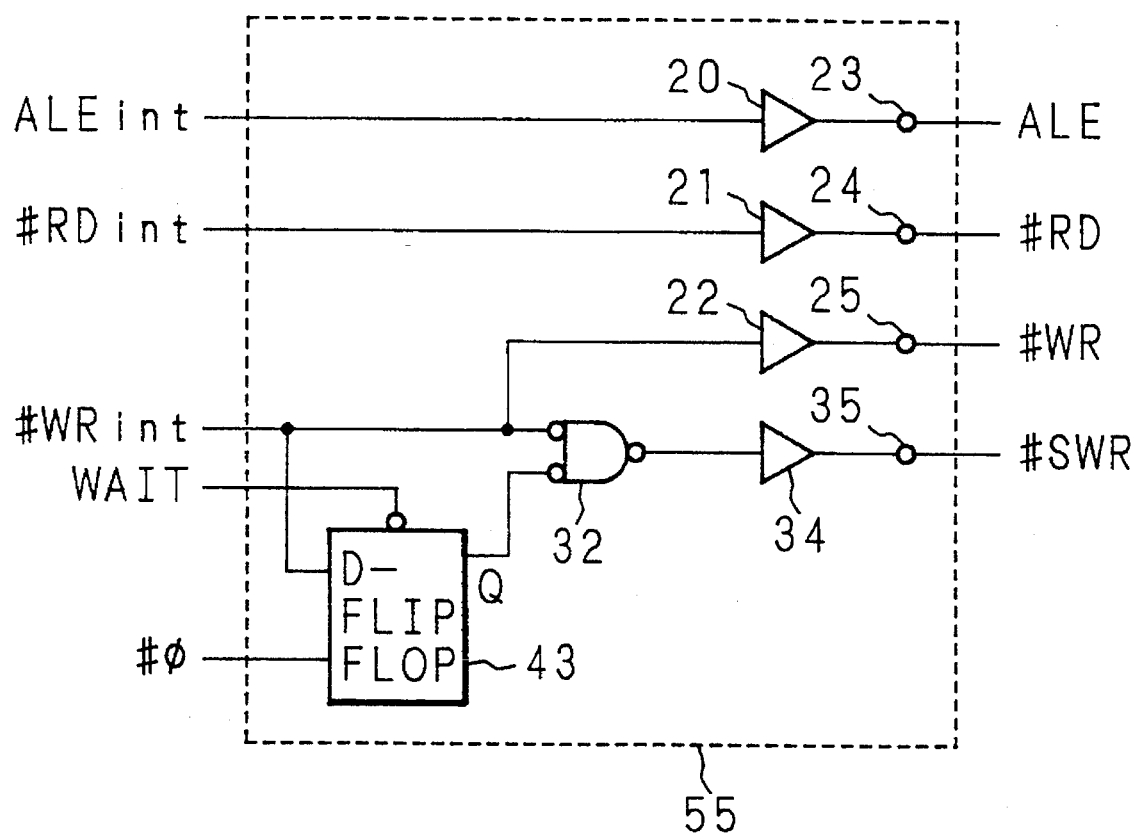
FIG. 17 is a circuitry diagram showing an essential part of a bus interface circuit of a seventh embodiment of the present invention.

FIG. 17 is a circuitry diagram showing an essential part of a bus interface circuit of a seventh embodiment of the present invention, and particularly, showing the part related to outputting of the control signals. The bus interface circuit 55 of the seventh embodiment is equivalent to the bus interface circuit 42 of the second embodiment shown in FIG. 8 as it is modified to use inverted signal of a control signal WAIT (a second timing signal) instead of the chip select signal #CS2 as the set signal of the D flip-flop 43. The control signal WAIT is a signal for controlling the period of bus accessing and is generated in the CPU 2. The bus interface circuit 55 of the seventh embodiment is otherwise the same as the bus interface circuit 42 of FIG. 8. Hence, in FIG. 17, parts similar to those previously described with reference to FIG. 8 are denoted by the same reference numerals, and will not be described below.

Figure 18:
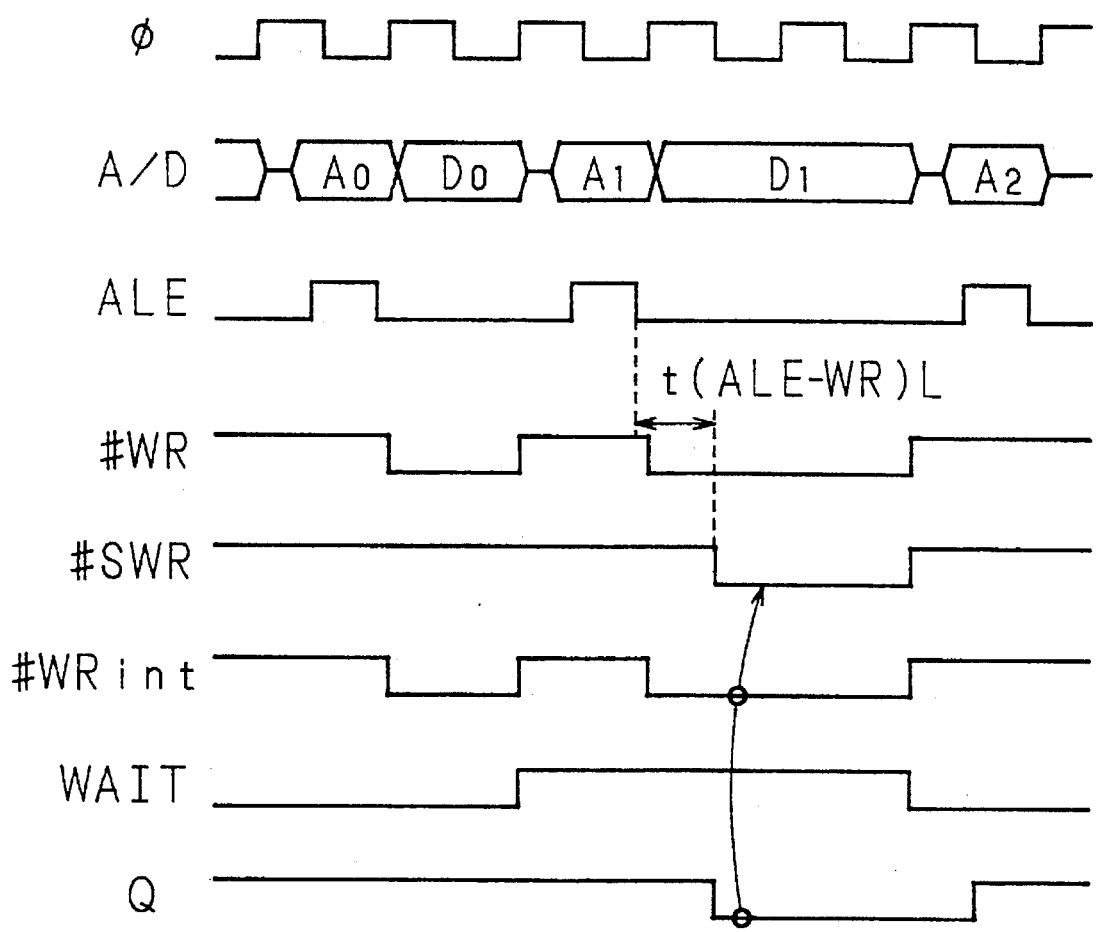
FIG. 18 is a timing chart showing operations in the seventh embodiment.

In the seventh embodiment, since the write signal #SWR to be supplied to the write signal input terminal of the exclusive use IC 17 is generated at a different timing from that in the second embodiment, operations which are different from those of the second embodiment will be described in the following. FIG. 18 is a timing chart showing operations of a bus interface circuit 55. In a microcomputer which comprises an external bus so that various external elements can be connected to the external bus, in general, an accessing time to access internal resource and an accessing time to access external resource are different from each other. Hence, in accessing an element requiring a long accessing time such as external resource, the bus access cycle is set long by setting the control signal WAIT at "H" level. On the other hand, in accessing internal resource such as an internal ROM or RAM which requires a short accessing time, since there is no need to have a long bus access time, the control signal WAIT is set at "L" level so that the bus access cycle will not be set long in other words, in the initial half of FIG. 18 bus cycle with the control signal WAIT staying at "L" level is a cycle for accessing internal resource, and therefore, terminates in two cycles of the clock signal ø. In the subsequent half bus cycle with the control signal WAIT staying at "H" level is a cycle for accessing external resource, terminates in three cycles of the clock signal ø.

Hence, using such a control signal WAIT as the set signal of the D flip-flop 43, it is structured to output the write signal #SWR only when the control signal WAIT stays at "H" i.e., during the longer bus access cycle, and to access the exclusive use IC 17 only during the longer bus access cycle.

Eighth Embodiment

Figure 19:
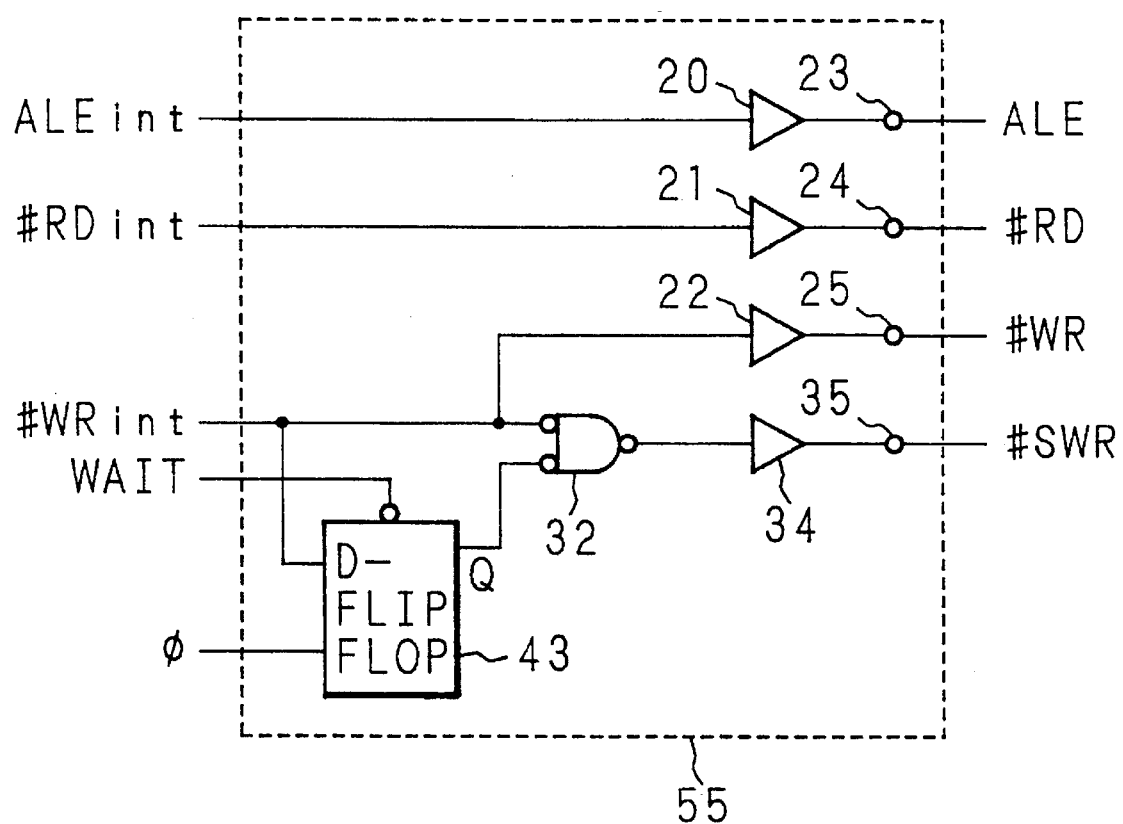
FIG. 19 is a circuitry diagram showing an essential part of a bus interface circuit of an eighth embodiment of the present invention.

The first to the seventh embodiments are related to an occasion of shifting the falling time of the write signal #SWR for the exclusive use IC 17 by half the cycle of the clock signal ø. Unlike these embodiments, the falling time of the write signal #SWR may be shifted by one cycle of the clock signal ø by changing the timing specifications of the exclusive use IC 17 (i.e., a period necessary as t(ALE-WR)L). FIG. 19 is a circuitry diagram showing a circuit structure of the bus interface circuit 55 which realizes this. Except for a difference that the clock signal ø is supplied to a clock input terminal of the D flip-flop 43 instead of the reversed clock signal #ø, the bus interface circuit 55 in this embodiment is similar to the bus interface circuit 55 of FIG. 17.

Figure 20:
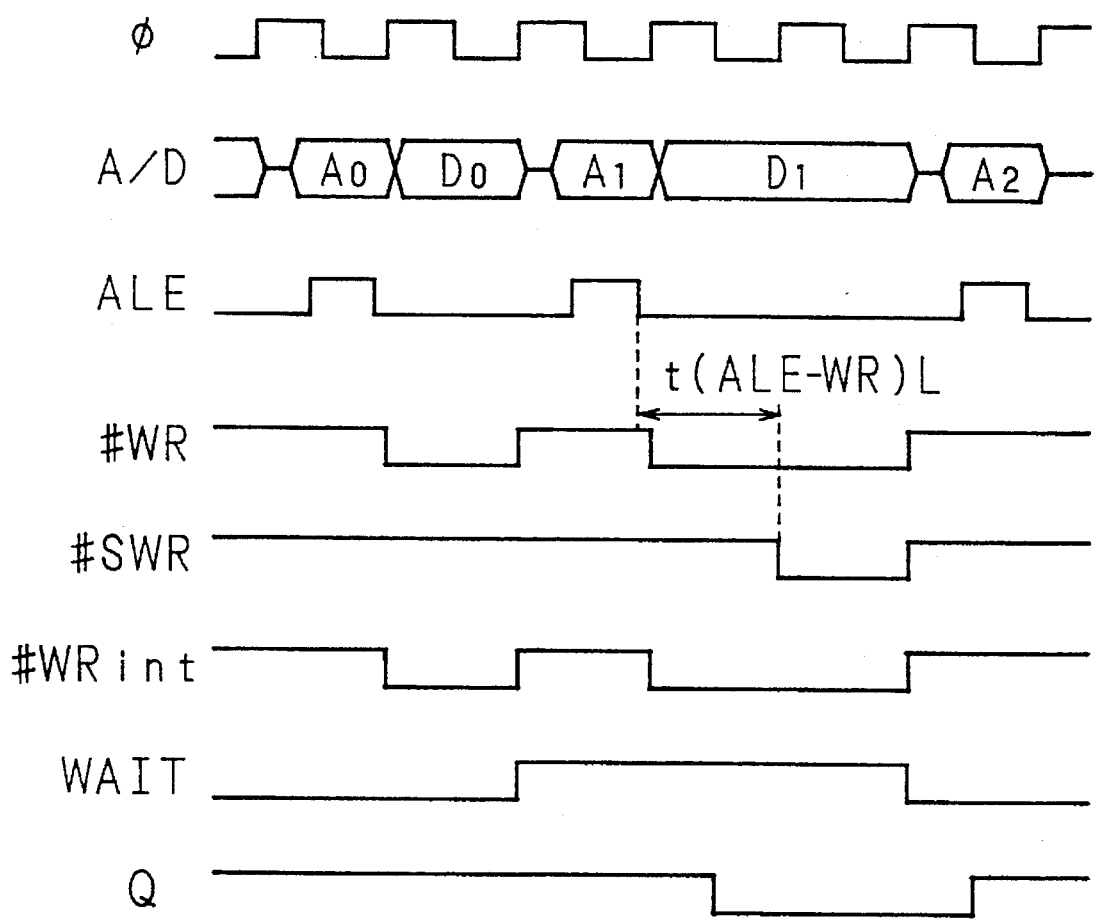
FIG. 20 is a timing chart showing operations in the eighth embodiment.

FIG. 20 is a timing chart showing operations in the eighth embodiment. In the eighth embodiment, since the output signal Q of the D flip-flop 43 falls when the clock signal ø rises, the output signal Q is further shifted by half the cycle of the clock signal ø as compared with the occasion of FIG.

18. This shifts a fall of the write signal #SWR also by half the cycle of the clock signal ø. As a result, the period t(ALE-WR)L becomes further longer by half the cycle of the clock signal ø.

The eighth embodiment reduces a possibility of malfunction due to a short period of the write signal #SWR. A reduction in the consumption power and radiation of a noise is attained in the eighth embodiment.

Further, the embodiments described above may be combined with each other in order to obtain a microcomputer as desired. Still further, although the foregoing has described only the write signal #WR in relation to the embodiments for convenience of description, the embodiments are applicable to the read signal #RD as well. However, in general, no problem substantially arises in the exclusive use IC even when the read signal #RD changes to "L" level before an address is established and data is outputted from other read register.

In addition, although the foregoing has described a case where the timings of the falling edges are different from each other, the present invention is also applicable to where the timings of the rising edges are different from each other and where the timings of both the falling and the rising edges are different from each other.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A microcomputer to be connected with external circuits having different access cycles via a multiplex bus which transfers an address/data signal and control signals, comprising:

a means for generating a first control signal having a first level when a first external circuit is to be accessed, and otherwise having a second level; and a control signal generating circuit responsive to said first control signal, for generating a second control signal when another external circuit is to be accessed, said second control signal changing from said second level to said first level at a different time than said first control signal.

2. A microcomputer according to claim 1, wherein said first control signal is a write signal to be supplied to a RAM, and said second control signal is a write signal to be supplied to a memory circuit which has a different access cycle from that of the RAM.

3. A microcomputer according to claim 1, wherein either said first or second control signal has said first level when writing into a predetermined region of an external circuit to be accessed, and is on said second level when writing into another region.

4. A microcomputer according to claim 1, further comprising a bit selector for outputting a timing signal which indicates that a CPU is in a writing state, wherein either said first or second control signal has said first level when said timing signal is active, and has said second level when said timing signal is inactive.

5. A microcomputer to be connected with external circuits having different access cycles via a multiplex bus which transfers an address/data signal and control signals, comprising:

a means for generating a first control signal having a first level when a first external circuit is to be accessed, and otherwise having a second level;

a control signal generating circuit responsive to said first control signal, for generating a second control signal when another external circuit is to be accessed, said second control signal changing from said second level to said first level at a different time than said first control signal; and a select signal generating circuit which generates a select signal for selecting an external circuit; wherein said control signal generating circuit is coupled to said select signal generating circuit for outputting said second control signal in response to said select signal.

6. A microcomputer according to claim 5, wherein said control signal generating circuit includes:

a flip-flop which receives said first control signal, a clock signal, and said select signal, said select signal being inputted to said flip-flop as a set input and a first logic circuit which receives said first control signal and an output of said flip-flop for outputting said second control signal.

7. A microcomputer according to claim 6, wherein said control signal generating circuit further includes a second logic circuit which receives said select signal inverted and said first control signal.

8. A microcomputer to be connected with external circuits having different access cycles via a multiplex bus which transfers an address/data signal and control signals, comprising:

a means for generating a first control signal having a first level when a first external circuit is to be accessed, and otherwise having a second level; and a control signal generating circuit responsive to said first control signal, for generating a second control signal when another external circuit is to be accessed, said second control signal changing from said second level to said first level at a different time than said first control signal, wherein said control signal generating circuit includes:
a flip-flop which receives said first control signal and a clock signal; and
a first logic circuit for outputting said second control signal which is on said first level when an output signal of said flip-flop and said first control signal are on said first level.

9. A microcomputer according to claim 8, wherein said control signal generating circuit further includes:
a first selector which selectively outputs an output signal of said first logic circuit or a port signal in response to a first timing signal which is defined in a CPU; and
a means for generating said first timing signal.

10. A microcomputer according to claim 8, wherein a second timing signal for controlling the timing of the flip-flop is inputted to said flip-flop.

11. A microcomputer according to claim 8, further comprising a register bit which generates a timing signal before said second control signal turns from said second level to said first level, wherein said timing signal is supplied to said flip-flop as a set input.

12. A microcomputer according to claim 11, further comprising a selector which receives said first control signal and an output signal of said first logic circuit as data inputs and said timing signal as a set input.

13. A microcomputer to be connected with external circuits having different access cycles via a multiplex bus which transfers an address/data signal and control signals, comprising:

a means for generating a first control signal having a first level when a first external circuit is to be accessed, and otherwise having a second level; and a control signal generating circuit responsive to said first control signal, for generating a second control signal when another external circuit is to be accessed, said second control signal changing from said second level to said first level at a different time than said first control signal, wherein said control signal generating circuit receives a third and fourth control signal to change a data bus width to be connected to an external circuit to which said first control signal is supplied.

14. A microcomputer according to claim 13, wherein said control signal generating circuit includes:

a flip-flop which receives said first control signal and a clock signal as data inputs and said third control signal as a set input;

a first logic circuit for outputting said second control signal which is on said first level when an output signal of said flip-flop and said first control signal are on said first level;

a first selector which selectively outputs said first control signal or said third control signal for an even address in response to a fourth timing signal which is defined in a CPU;

a second selector which selectively outputs the output signal of said first logic circuit or said fourth control signal for an odd address in response to said fourth timing signal.

15. A microcomputer according to claim 13, wherein said control signal generating circuit is constructed such that said control signal generating circuit outputs said first and second control signal when said data bus width is 8-bits, and outputs said third and fourth control signal when said data bus width is 16-bits.

16. A microcomputer to be connected with external circuits having different access cycles via a multiplex bus which transfers an address/data signal and control signals, comprising:

a means for generating a first control signal having a first level when a first external circuit is to be accessed, and otherwise having a second level; and a control signal generating circuit responsive to said first control signal, for generating a second control signal when another external circuit is to be accessed, said second control signal changing from said second level to said first level at a different time than said first control signal, wherein either said first or second control signal has said first level when an external circuit a having first access cycle is to be accessed, and has said second level when another external circuit having an access cycle that is shorter than said first access cycle is to be accessed.

* * * * *

UNITED STATES PATENT AND TRADEMARK OFFICE
CERTIFICATE OF CORRECTION

PATENT NO. : 5,588,124
DATED : December 24, 1996
INVENTOR(S) : Katsunobu Hongo

It is certified that error appears in the above-indentified patent and that said Letters Patent is hereby corrected as shown below:

Title page, item [54] and col. 1, lines 1-2, should read--CONTROL SIGNAL GENERATION FOR ACCESS TO EXTERNAL CIRCUITS BY A MICROCOMPUTER--.

Signed and Sealed this

Sixth Day of May, 1997

*Attest:*

BRUCE LEHMAN

*Attesting Officer*  *Commissioner of Patents and Trademarks*